(12) United States Patent
Shiragaki et al.

(10) Patent No.: US 8,886,013 B2
(45) Date of Patent: Nov. 11, 2014

(54) DEVICE AND METHOD FOR PREVENTING UNAUTHORIZED REPRODUCTION OF CONTENT

(75) Inventors: Tatsuya Shiragaki, Tokyo (JP); Yasuhiro Miyao, Tokyo (JP)

(73) Assignee: Nec Corporation, Tokyo (JP)

( * ) Notice: Subject to any disclaimer, the term of this patent is extended or adjusted under 35 U.S.C. 154(b) by 1099 days.

(21) Appl. No.: 12/508,351

(22) Filed: Jul. 23, 2009

(65) Prior Publication Data

US 2010/0021132 A1    Jan. 28, 2010

(30) Foreign Application Priority Data

Jul. 24, 2008    (JP) ................. 2008-190481

(51) Int. Cl.
| | |
|---|---|
| *H04N 5/91* | (2006.01) |
| *G11B 20/00* | (2006.01) |
| *H04N 7/16* | (2011.01) |
| *H04N 7/173* | (2011.01) |
| *H04N 21/21* | (2011.01) |
| *H04N 21/23* | (2011.01) |
| *H04N 21/266* | (2011.01) |
| *H04N 21/433* | (2011.01) |
| *H04N 21/4405* | (2011.01) |
| *H04N 21/442* | (2011.01) |
| *H04N 21/443* | (2011.01) |
| *H04N 21/458* | (2011.01) |
| *H04N 21/4623* | (2011.01) |
| *H04N 21/472* | (2011.01) |
| *H04N 21/81* | (2011.01) |
| *G11B 20/10* | (2006.01) |

(52) U.S. Cl.
CPC .... *G11B 20/00086* (2013.01); *G11B 20/00173* (2013.01); *G11B 20/0021* (2013.01); *G11B 20/00833* (2013.01); *G11B 20/0084* (2013.01); *G11B 20/00869* (2013.01); *G11B 2020/10537* (2013.01); *H04N 7/162* (2013.01); *H04N 7/17318* (2013.01); *H04N 21/21* (2013.01); *H04N 21/23* (2013.01); *H04N 21/26613* (2013.01); *H04N 21/4331* (2013.01); *H04N 21/4405* (2013.01); *H04N 21/44209* (2013.01); *H04N 21/44236* (2013.01); *H04N 21/443* (2013.01); *H04N 21/4583* (2013.01); *H04N 21/4586* (2013.01); *H04N 21/4623* (2013.01); *H04N 21/47202* (2013.01); *H04N 21/8166* (2013.01)

USPC .................................................. 386/248

(58) Field of Classification Search
CPC .................... G11B 20/00086; G11B 20/0084; H04N 21/4405; H04N 21/4436; H04N 21/47202; H04N 7/162

See application file for complete search history.

(56) References Cited

U.S. PATENT DOCUMENTS

| | | | |
|---|---|---|---|
| 2004/0001087 A1 | 1/2004 | Warmus et al. | |
| 2004/0044824 A1* | 3/2004 | Haneda et al. | 711/1 |

(Continued)

FOREIGN PATENT DOCUMENTS

| | | |
|---|---|---|
| EP | 1587316 | 10/2005 |
| EP | 1887799 A | 2/2008 |

(Continued)

OTHER PUBLICATIONS

European Search Report for EP 09 16 59588 completed Dec. 2, 2009.

(Continued)

*Primary Examiner* — Huy T Nguyen
(74) *Attorney, Agent, or Firm* — Sughrue Mion, PLLC

(57) ABSTRACT

A device for reproducing a content having at least one reproduction start time predetermined, includes: a non-real time receiver for receiving a content in non-real time; a scheduler for scheduling reception of a content whose delivery method is non-real time delivery by the non-real time receiver based on a current time and a reproduction start time of the content; a content storage section for storing at least one content received by the non-real time receiver; and a reproduction controller for inhibiting reproduction of a content stored in the content storage section before the reproduction start time of the content.

18 Claims, 15 Drawing Sheets

(56) References Cited

U.S. PATENT DOCUMENTS

| | | | |
|---|---|---|---|
| 2005/0144644 A1* | 6/2005 | Hirota | 725/90 |
| 2005/0177853 A1 | 8/2005 | Williams | |
| 2008/0065782 A1 | 3/2008 | Jones | |
| 2008/0189044 A1* | 8/2008 | Chamberlain et al. | 702/14 |

FOREIGN PATENT DOCUMENTS

| | | |
|---|---|---|
| GB | 2405297 A | 2/2005 |
| JP | 2003299055 A | 10/2003 |
| JP | 2005191950 A | 7/2005 |
| JP | 2005210347 A | 8/2005 |
| JP | 2007104588 A | 4/2007 |
| JP | 2007274318 A | 10/2007 |
| JP | 2008113231 A | 5/2008 |
| WO | 2004053842 A | 6/2004 |

OTHER PUBLICATIONS

European Communication for EP 09 16 5958 dated Mar. 1, 2011.
"Architecture of Windows media rights manager", Internet Citation, XP002986587, May 1, 2004, Retrieved from the Internet, URL:http://www.microsoft.com/windows/windowsmedia/howto/articles/drmarchitecture.aspx.
European Communication for EP 09 165 958.1 dated Feb. 9, 2012.

* cited by examiner

FIRST EXAMPLE

SECOND EXAMPLE

FOURTH EXAMPLE

DEVICE AND METHOD FOR PREVENTING UNAUTHORIZED REPRODUCTION OF CONTENT

This application is based upon and claims the benefit of priority from Japanese Patent Application No. 2008-190481, filed on Jul. 24, 2008, the disclosure of which is incorporated herein in its entirety by reference.

BACKGROUND OF THE INVENTION

1. Field of the Invention

The present invention relates to a content reproduction device that receives and reproduces a content comprised of picture or images, sound, and the like and, more particularly, to a method and device for preventing unauthorized reproduction of a content as well as to an electronic equipment system for the same.

2. Description of the Related Art

I. Description of Terms

First of all, a brief mention is made of several terms used in a description of the technologies related to the present invention.

Real time delivery is a delivery method in which a receiving side sequentially reproduces a content (e.g., images and sound) upon receipt thereof without waiting for the transfer, from the sending side to the receiving side, of the whole content from beginning to end to be completed. If a content transfer period (time taken to transfer a content) and a buffering period to absorb delays in the transfer of the content are excluded, the time at which the content is broadcast or communicated substantially coincides with the time at which the content is reproduced. For example, the delivery of a content by streaming (hereinafter, referred to as streaming delivery) is real time delivery.

Non-real time delivery is a delivery method in which a sending side transfers the whole of a content to a receiving side first, and thereafter the receiving side reproduces the content. The reproduction start time of the content is at least a content transfer period after the transfer start time of the content. For example, delivery by downloading (hereinafter, referred to as downloading delivery) is non-real time delivery.

Reproduction rate is the amount of information (the number of bits) per unit time required to reproduce moving picture or images. For example, in a case where moving picture data is compressed for transmission as in the case of Moving Picture Experts Group (MPEG), which is one of the schemes for compressing moving-picture data, the bit rate in the compressed state (e.g., MPEG state) is the reproduction rate. The reproduction rate is an attribute of an encoded content. Hereinafter, moving-picture data is called a picture signal as appropriate.

Transmission rate is the bit rate of a signal flowing over a transmission line when the signal is transmitted through the transmission line. For example, under the service of 8-Mbps (Mega bit per second) Asymmetric Digital Subscriber Line (ADSL), the transmission rate is 8 Mbps. The transmission rate is physically fixed, depending on the transmission service in use.

Transfer rate is a communication rate between a port for an operating system (OS) program of a system delivering a content and a port for an OS program of a system receiving the content. The transfer rate is also referred to as throughput in some cases. Generally, since a network band in an intermediate network is statistically shared among communications between different pairs of host computers, the transfer rate is a value that can be obtained by averaging. The transfer rate depends on the state of congestion of a network and on the throughput of a server. Moreover, since packets are transferred through the transmission line, the sum of the transfer rates of the communications through the same transmission line is not higher than the transmission rate. Note that the transfer rate equals the transmission rate when the network band is not shared among communications between different pairs of host computers but can be exclusively used.

Program is a content for which at least a program start time (the time at which televising of a content is started), a program end time (the time at which televising of a content is ended), and a content supply method (a method for supplying a content) are determined. Note that even in a case where the program end time is not explicitly determined, it is sufficient that the program end time can be found by calculation or the like. For example, if a content reproduction period (time taken to reproduce a content) is determined, it can be calculated that the program end time is the time at which the content production period has passed since the program start time. As to the content supply method, conceivable examples include a content for which a frequency and a modulation and demodulation scheme are determined, a content for which a location and a downloading method are determined, and the like. As an example of a content for which a location is determined, a content for which a Uniform Resource Locater (URL), where the content is located, is determined can be said to be among the examples of a content for which a content supply method is determined. Incidentally, the URL explicitly indicates the location of a content, the name of a file, and a protocol to use, like "protocol name+host name+path name" to access or "protocol name+IP address+path name" to access, serving as a link to a content.

Channel is a set of a single program or a plurality of programs. Examples of the set include a set of programs the contents of which are delivered by the same entity, and a set of programs that belong to the same category although the program contents are delivered by different entities. In the case of television broadcasting, a channel is assigned to the radio frequency of a carrier wave.

II. Related Art

Studies have been made on technologies for delivering, by using a network, contents similar to those broadcast on television. For example, Japanese Patent Application Unexamined Publication No. 2005-210347 discloses, as a method for real time delivery of a moving picture signal, a streaming broadcast system that delivers moving picture and sound by streaming using packets such as Internet Protocol (IP) packets. According to this system, streaming delivery is performed after a communication band in a network is assigned, whereby loss of packets or degradation in moving picture quality due to a long delay or the like is avoided, and stably delivered data is accomplished.

Japanese Patent Application Unexamined Publication No. 2007-104588 discloses a method for delivering picture and sound by digital broadcasting using radio waves. Generally, in digital broadcasting, a frequency band is assigned to each channel. For example, in the terrestrial digital broadcasting described in this document, a communication bandwidth per channel is 6 MHz. The bit rate of information that can be transmitted within the bandwidth is determined depending on the communication bandwidth allotted, propagation state of radio waves, modulation scheme, and the like. For example, in the case of terrestrial digital broadcasting in which a bandwidth of 6 MHz is allotted, it is possible to transmit information at a maximum rate of approximately 20 Mbps when Quadrature Amplitude Modulation (QAM) and Orthogonal Frequency Division Multiplex (OFDM) are used, and if the carrier-to-noise ratio (CN ratio: the ratio of carrier frequency power to noise power) is good. Not only in this example, the fact that the bandwidth per channel is fixed imposes a limit on the bit rate at which transmission can be performed using the bandwidth in question. Accordingly, it is impossible to achieve infinite information transmission rate (bit rate).

Japanese Patent Application Unexamined Publication No. 2005-191950 discloses an example in which broadcasting over radio waves is used as a method for real time delivery and a downloading function is utilized as a method for other delivery. For example, the capability/incapability of downloading is displayed on-screen in an Electronic Program Guide (EPG), and an audience has a look at this guide and makes a click to start downloading if necessary.

Japanese Patent Application Unexamined Publication No. 2007-274318 discloses a technology in which determination is made as to whether or not to permit the reproduction of a selectively downloaded program, with the consciousness of the broadcast start time of the program. More specifically, a sending side, as a controlling entity, performs control of delivering a permission for the reproduction of a program only at or after the reproduction start time of the program.

Japanese Patent Application Unexamined Publication No. 2003-299055 discloses a video delivery system for avoiding degradation in the quality of a content due to an insufficient communication band. Specifically, a video delivery server preliminarily delivers to a subscriber accommodation device a content that requires no "real timeliness" and is scheduled to be delivered on the following day. Upon receipt of a request for the content from a subscriber terminal, the video delivery server instructs the subscriber accommodation device to send the preliminarily delivered content to the subscriber terminal.

Moreover, a network delivery video reproduction device disclosed in Japanese Patent Application Unexamined Publication No. 2008-113231 makes a request to a content delivery server for delivery of a content and receives the content encrypted. Then, when the view-enable date and time (the date and time at which the content can be viewed) has come, the network delivery image reproduction device acquires a decryption key by making a request to the content delivery server and decrypts the content by using the decryption key, thus reproducing the content.

First, in a case of displaying video upon receipt of a streaming delivery as in Japanese Patent Application Unexamined Publication No. 2005-210347 and in a case of receiving a digital television broadcast as in Japanese Patent Application Unexamined Publication No. 2007-104588, since a band to be used for communication or broadcasting is predetermined, it is impossible to deliver a content having a reproduction rate greater than the predetermined bandwidth. For example, in a case where an ADSL transmission line capable of communication at a maximum bit rate of 8 Mbps is used, it is impossible to reproduce a picture signal having a reproduction rate of 20 Mbps by real time delivery because 20-Mbps transfer cannot be made by streaming. Moreover, in a case of the current terrestrial digital broadcasting, broadcasting can be performed only at a maximum rate of approximately 20 Mbps per channel even if all of the 13 segments are used. Therefore, it is impossible to transmit/receive a broadcast of a picture signal having a reproduction rate of 30 Mbps. That is, in this case, it is impossible to receive real time delivery of a picture signal having a reproduction rate of 30 Mbps.

Moreover, in Japanese Patent Application Unexamined Publication No. 2005-191950, downloading is started in such a manner that an audience has a look at a display of the capability/incapability of downloading and then makes a click. Accordingly, when a program that the audience wants to view has not been downloaded, the downloading of the program is started then, with the result that the program cannot be reproduced immediately, or that the reproduction quality of the content is degraded. This will be described below more specifically.

For example, a case will be considered where just after a audience clicks a program content A having sufficient lead time (for example, one week) prior to reproduction but having a large file size (the transfer rate is assumed to be a), the audience comes to want to view a program content B whose broadcast start time is the point of time of clicking the program content A and whose reproduction rate is equal to the transmission rate, z. Since the transmission band is already used for the earlier started downloading of the program content A, the transfer rate that can be used for new downloading is (z-a), a value smaller than the transmission rate z by the transfer rate a of the program content A. The new usable transfer rate (z-a) is not higher the reproduction rate z (=transmission rate) of the later desired program content B. Accordingly, information cannot be transferred in the amount per unit time required to reproduce the program content B. In such a condition, even if the reproduction is performed while the file is being downloaded, the reproduction cannot be performed at the predetermined reproduction rate, resulting in degradation in picture quality (such as a frame loss and degraded resolution). Moreover, even if the program content is viewed after the downloading of the program content is completed, it is not until the downloading period has passed since the program start time of the program content that the program content can be reproduced. That is, the program content cannot be reproduced at the program start time preset by a contents provider. Accordingly, for example, when channels are changed, a content may not be able to be reproduced according to a programming schedule, depending on the status of downloading.

In a case of a program content C having a production rate higher than the transmission rate as well, since the downloading of the program content is started when a click is made at the program start time, the program content cannot be reproduced at the program start time. Alternatively, its picture is reproduced after a wait of the downloading period.

In Japanese Patent Application Unexamined Publication No. 2007-274318, a term "broadcasting device" indicates a content delivery server for downloading, and no description is given of a technology including real time delivery. Therefore, a live program cannot be delivered or broadcast. Moreover, the technology disclosed in this document is designed for selectively downloading contents. When performing selective downloading, a broadcasting device uploads a content only when a content reproduction device requests a download. Therefore, in a case where the delivery of a program content having a reproduction rate higher than the transmission rate is not completed before the program start time of this program content, when an audience changes channels to view this program after the program start time, the consequence is that the degraded picture is reproduced, or that the picture is reproduced after a wait of the downloading period, similarly to the problem with Japanese Patent Application Unexamined Publication No. 2005-191950.

As described above, according to the aforementioned technologies, it is impossible to reproduce a program content having a reproduction rate higher than the transmission rate at the program start time. In addition, a similar problem may arise with a program content having a reproduction rate higher than the transfer rate that can be used to transfer the program content. This is because, since the transfer rate is always not higher than the transmission rate, the transfer rate is not higher than the reproduction rate, and therefore, it is impossible to transmit information in the amount required for reproduction.

According to the aforementioned technologies described in Japanese Patent Application Unexamined Publication Nos. 2005-210347, 2007-104588, 2005-191950, and 2007-274318, a program content having a reproduction rate higher than the transmission rate or transfer rate cannot be reproduced at its program start time.

According to the picture delivery system disclosed in Japanese Patent Application Unexamined Publication No. 2003-299055, a picture delivery server preliminarily delivers to a subscriber accommodation device a content scheduled to be delivered on the following day and, upon request from a subscriber terminal, instructs the subscriber accommodation device to send the preliminarily delivered content to the subscriber terminal. That is, at "the time to perform preliminary delivery," the server side checks whether or not there is any one to deliver among next day's contents and, if there is a content to preliminarily deliver, transmits the content to a subscriber accommodation device. It is the picture delivery server that determines whether or not to make a download.

In other words, according to the system in this document, the content delivery server side controls the preliminary delivery of a content. Accordingly, if a plurality of content delivery servers independently exist, and if their respective times to perform content delivery coincide, then contents having the total size exceeding a subscriber's transmission rate are to be received, sometimes resulting in a subscriber accommodation device being unable to receive the contents. Moreover, preliminarily downloaded is always a next day's content. Therefore, if a content to be downloaded for the following day has a very large amount of information, the problem may arise that the amount to be downloaded is so large that the downloading cannot be completed before the program start time.

The network delivery image reproduction device disclosed in Japanese Patent Application Unexamined Publication No. 2008-113231, as described above, acquires a decryption key for decrypting an encrypted content at the view-enable date and time and decrypts the content by using this decryption key to reproduce the content. Accordingly, the content cannot be legitimately viewed before the view-enable date and time. However, according to this document, since a content is delivered in response to a request for delivery of the content made by a user, there are some occasions when a content cannot be reproduced on time at the view-enable date and time, when a user suddenly wants to view the content that the user has not desired to.

SUMMARY OF THE INVENTION

An object of the present invention is to provide a content reproduction device as well as a method for preventing unauthorized reproduction of a content by which a content having a reproduction rate higher than a transfer rate or transmission rate, which are restricted depending on a transmission line, can be received and reproduced at the reproduction start time of the content, and also by which unauthorized reproduction of an arbitrary content before the reproduction start time of this content can be effectively prevented.

According to the present invention, a device for reproducing a content having at least one reproduction start time predetermined, includes: a non-real time receiver for receiving a content in non-real time; a scheduler for scheduling reception of a content whose delivery method is non-real time delivery by the non-real time receiver based on a current time and a reproduction start time of the content; a content storage section for storing at least one content received by the non-real time receiver; and a reproduction controller for inhibiting reproduction of a content stored in the content storage section before the reproduction start time of the content.

According to the present invention, a method for preventing unauthorized reproduction of a content having at least one reproduction start time predetermined, includes the steps of: scheduling reception of a content whose delivery method is non-real time delivery by the non-real time receiver based on a current time and a reproduction start time of the content; storing at least one content received by the non-real time receiver in a content storage section; and inhibiting reproduction of a content stored in the content storage section before the reproduction start time of the content.

According to the present invention, it is possible to receive a content having a reproduction rate higher than a transfer rate or transmission rate, which are restricted depending on a transmission line, and to reproduce the content at its reproduction start time. In addition, it is also possible to effectively prevent unauthorized reproduction of an arbitrary content before its reproduction start time.

DETAILED DESCRIPTION OF THE PREFERRED EMBODIMENTS

1. Exemplary Embodiment

In general, television broadcasting can be classified into two categories, live broadcasting and taped broadcasting, from the viewpoint of whether or not the timing of making a content coincides with the timing of broadcasting the content. On the other hand, from the viewpoint of delivery methods over a network, delivery can be classified into two types: real time delivery by which images and sound are broadcast as they are shot and recorded on camera, and non-real time delivery in which a broadcast to a audience requires no "real timeliness," such as the delivery of a content recorded in advance. Accordingly, for example, at a broadcasting station, it is possible to assign those contents recorded in advance for non-real time delivery and assign live programs for real time delivery. Incidentally, for the real time delivery, methods such as streaming and television broadcasting over radio waves can be used. For the non-real time delivery, methods such as file downloading can be used.

In the non-real time delivery, unlike the real time delivery, it is not necessary to make a delivery at a certain fixed time. Therefore, the following method can be used. First, a content reproduction device receives and stores a non-real time program content before the program start date and time of the content. Then, at the program start date and time, the stored content is reproduced. When a audience views a program delivered in real time, the audience starts the reproduction of the program delivered in real time when the program is started. With such a configuration and method, a audience can view a content delivered by using a network in real time or in non-real time without being conscious of the delivery method, with a similar sense that the audience has in the case of general television broadcasting.

1.1) Configuration

Figure 1:
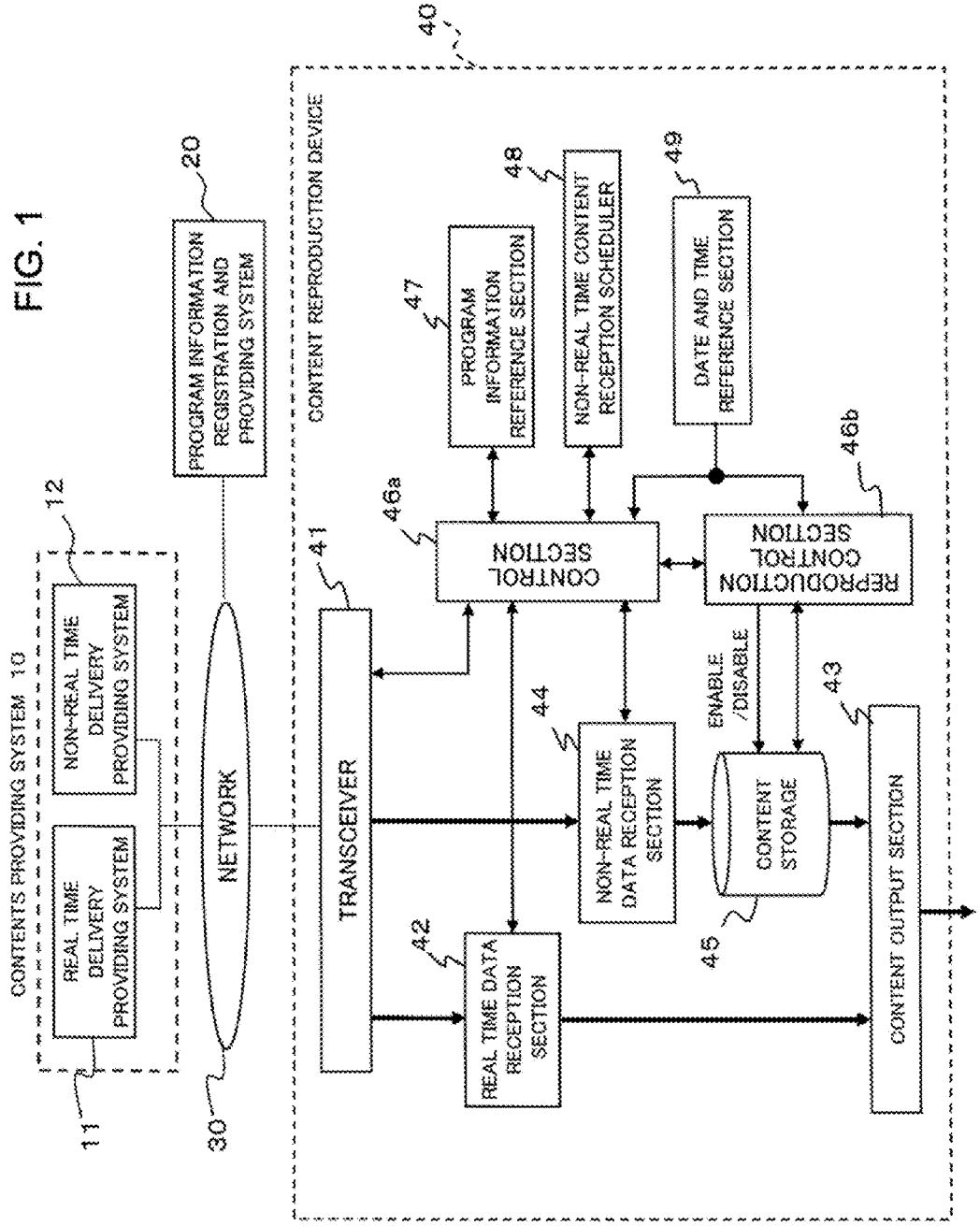
FIG. 1 is a block diagram showing an example of a content delivery system using a content reproduction device according to an exemplary embodiment of the present invention.

FIG. 1 is a block diagram showing an example of a content delivery system using a content reproduction device according to an exemplary embodiment of the present invention. Here, it is assumed that a contents providing system 10, a program information registration and providing system 20, and a content reproduction device 40 are connected to a network 30. The network 30 may be any one of a wired network and a wireless network and any one of a public network and a private network. The content reproduction device 40 performs scheduling to receive a non-real time content from the contents providing system 10 through the network 30 before the corresponding program is started, which will be described later.

The contents providing system 10 that delivers a content includes a real time delivery providing system 11 and a non-real time delivery providing system 12. A party delivering a content registers program information with the program information registration and providing system 20. The program information includes the identifier of the program (program identifier), the start time of the program (program start time), a method of delivering the program content (program delivery method), and the like.

By designating the program delivery method as program information to be registered, a program content is associated with any one of the real time delivery providing system 11 and the non-real time delivery providing system 12 of the contents providing system 10. If a program content is to be delivered by real time delivery, it is sufficient for an audience to receive delivery of the program content from the real time delivery providing system 11 that is associated with the program content in question by the program information registration and providing system 20. If a program content is to be delivered by non-real time delivery, it is sufficient for a audience to receive delivery of the program content from the non-real time delivery providing system 12 that is associated with the program content in question by the program information registration and providing system 20.

The content reproduction device 40 has a transceiver section 41 that connects to the network 30 and performs transmission and reception of data and control signals. Data delivered in real time from the real time delivery providing system 11 is received by a real time data reception section 42 and output from a content output section 43 to a reproduction device (not shown). Data delivered in non-real time from the non-real time delivery providing system 12 is received by a non-real time data reception section 44, stored in a content storage section 45, and, at the program start time, output to the reproduction device through the content output section 43.

The content reproduction device 40 has a functional configuration as shown in FIG. 1, and the overall operation thereof is controlled by a control section 46a. Here, the control section 46a carries out content reception operation by using a program information reference section 47, a non-real time content reception scheduler 48, and a date and time reference section 49, whereas a reproduction control section 46b carries out content reproduction control by using the date and time reference section 49 and content storage section 45. Note that functions similar to the control section 46a, reproduction control section 46b, program information reference section 47, non-real time content reception scheduler 48, and date and time reference section 49 can also be implemented with software, by executing programs on a program-controlled processor such as a CPU.

1.2) Operation

The control section 46a references program information from the program information registration and providing system 20, which is received by the program information reference section 47, and date and time information (current time information) from the date and time reference section 49, and checks whether or not, among program contents for which non-real time delivery is used as delivery method, there is any one that is before its program start time and has not yet been delivered. When there is at least one program content to be subjected to non-real time delivery, the non-real time content reception scheduler 48, under the control of the control section 46a, performs scheduling, based on the program start times of the yet-to-be-delivered contents and the current time information, so that the non-real time deliveries of the contents will have been completed before the respective program start times. The control section 46a controls the transceiver section 41, non-real time data reception section 44, and content storage section 45, so that each content is received from the non-real time delivery providing system 12 in accordance with the yet-to-be-delivered content reception schedule and stored in the content storage section 45.

The reproduction control section 46b references the date and time information from the date and time reference section 49 and, if the referenced date and time is before the program start time of an arbitrary content, inhibits this content from being reproduced from the content storage section 45. When the program start time has come, the reproduction control section 46b permits reproduction and sequentially outputs the content from the content storage section 45 to the content output section 43, thus reproducing the content. Various methods can be employed for the method of inhibiting reproduction, such as limiting access to a file and restricting decryption of an encrypted file, which will be shown in examples described later.

On the other hand, with respect to programs for which real time delivery is performed as delivery method, under the control of the control section 46a, a real time content is received from the real time delivery providing system 11 by using the transceiver section 41 and real time data reception section 42, targeted for reproduction at the program start time of the content. The content in question is then sequentially output to the content output section 43 and reproduced.

As described above, the control section 46a of the content reproduction device 40 can gain knowledge of which one of real time delivery and non-real time delivery is used to deliver a program content, by referencing the program information containing the program start time. A program for real time delivery is received by the real time data reception section 42 so that the content of the program is reproduced at its program start time. A program for non-real time delivery is scheduled so that the receipt of the content of the program will have been completed before the program is started, and the program content is stored in the content storage section 45. The reproduction control section 46b inhibits reproduction of the thus stored content before its program start time. The content is reproduced from the content storage section 45 at its program start time.

Regarding a content having a reproduction rate higher than the transfer rate, as described earlier, since information cannot be transferred in a quantity required for reproduction so as to be in time for reproduction, it is impossible to deliver and reproduce the content in real time without degradation in quality. For a program content that has such a reproduction rate but does not require real timeliness, a content deliverer selects non-real time delivery as the content delivery method and registers it with the program information registration and providing system 20. The content reproduction device 40 refers to the program information registration and providing system 20, makes a non-real time delivery reception schedule such that the receipt of the program content in question will have been completed before the program start time, and completes the storage of the program content before the program start time. Since it is possible to take time not shorter than the duration of this program to receive the program content in question before the program start time, it is possible to receive delivery of the information beforehand in a quantity (the reproduction rate×the duration of the program) that is not smaller than the amount of information obtained by multiplying the transfer rate by the duration of the program.

As an example, suppose that an original picture signal is of a one-hour program at 40 Mbps. Assuming that the transfer rate of a transmission system or broadcasting system is 20 Mbps, the 40-Mbps signal cannot be transferred as it is by real time delivery (e.g., streaming or digital broadcasting). However, by adopting non-real time delivery, it is possible to transfer as much information as one hour of the 40-Mbps signal. In the case of this example, it is sufficient to take two hours to receive non-real time delivery of the one-hour program.

1.3) Effects

The following effects can be obtained by adopting non-real time delivery in addition to real time delivery as described above In the non-real time delivery, since the transfer rate and the reproduction rate are independent of each other, it is possible to receive delivery of a high-definition content having a reproduction rate higher than the transfer rate. In this event, by referencing program start times and the current time, scheduling is performed to decide which program content for non-real time delivery is to be received preferentially, or to decide when to receive which program content for non-real time delivery. Thereby, it is possible to complete the receipt of non-real time delivery of a content before the program start time of the content. That is, since a long time can be taken to receive delivery of a content beforehand, it is possible to reproduce and display the content without degradation in quality, with as exact definition as the content in the original quantity of information has.

Even if programming is made of a mixture of real time deliveries and deliveries of those contents having reproduction rates higher than the transfer rate and/or transmission rate restricted depending on a transmission line, it is possible to reproduce each program content at its program start time without causing degradation in quality. Accordingly, even if a switch is made to another program content scheduled to be used at the then time, it is possible to reproduce another program content at the reproduction rate specific to the another program content.

Moreover, if the present exemplary embodiment is applied to a network in which a band for transferring a content file is not assigned in advance, the following effects can be obtained.

Even if a necessity arises to receive a real time program content after the program start time of another program content that has been already delivered in non-real time, only the traffic for delivery of the real time content is required because the non-real time content has been already downloaded. For example, suppose a case where contents C and D are delivered through channels 1 and 2, respectively, at a certain time. According to the related arts described earlier, streaming deliveries (real time deliveries) of these contents take place at the same time.

In comparison, according to the present exemplary embodiment, scheduling is performed to assign the content C on the channel 1 for downloading delivery (non-real time delivery), and the content C is downloaded and stored in advance. Therefore, when a delivery of the content D on the other channel (channel 2) takes place, it is only the content D that is subjected to streaming delivery because the content C has been already downloaded. Accordingly, in the entire network, it is possible to reduce the used amount of the network band resource when the content D is delivered in real time, allowing the network to be used for other applications.

Moreover, from the perspective of a user receiving the streaming delivery, it is possible to stably receive the streaming delivery without congestion because the operation band of the network is not fully occupied. Additionally, the entire network can be used efficiently if a program content for non-real time delivery is delivered when traffic is light, avoiding a time of day when traffic on the network is congested.

With a configuration and method as described above, in delivery of a program content whose reproduction time is fixed or restricted, it is also possible to receive a live program content. Moreover, it is possible to reproduce a program content having a larger quantity of information than the transfer rate and/or transmission rate restricted depending on a transmission medium, at the program start time of the program content.

Furthermore, an audience can view a content delivered by using a network in real time or in non-real time, without being conscious of the delivery method, with a similar sense that the audience has in the case of general television broadcasting. Particularly in the case of a content for non-real time delivery, although the downloading of the content can be completed before the reproduction start time of the content regardless of a user, the content, if downloaded, is inhibited from being reproduced before the reproduction start time. At the reproduction start time, the inhibition of reproduction is lifted, enabling the reproduction of the content. Accordingly, it is possible to effectively prevent unauthorized reproduction of an arbitrary content before its reproduction start time.

Hereinafter, several examples of the specific configuration of an electronic equipment system that implements a method and device for preventing unauthorized reproduction according to the present invention will be illustrated.

2. First Configuration Example 2.1) Configuration

Figure 2:
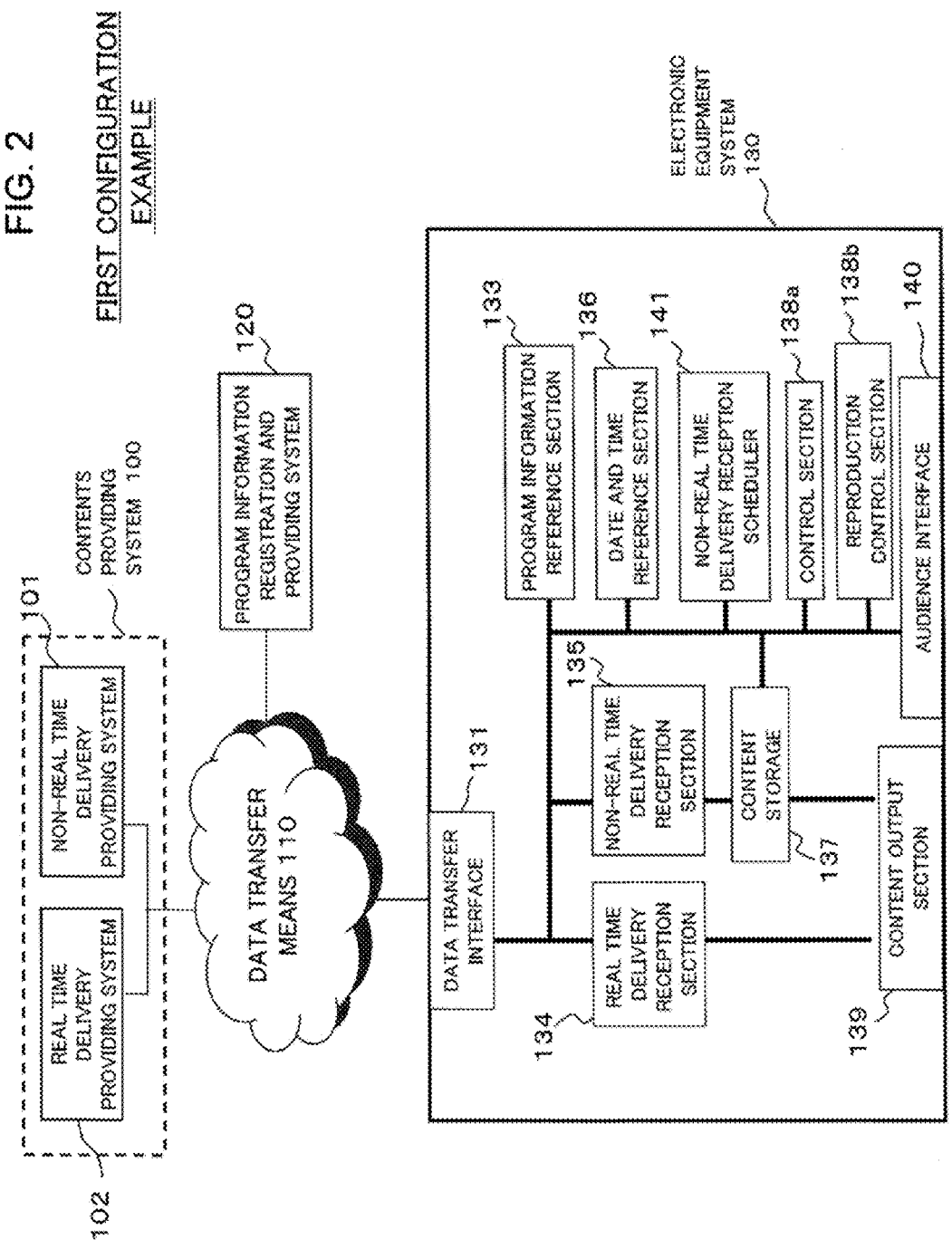
FIG. 2 is a block diagram showing a first configuration example of an electronic equipment system implementing an unauthorized-reproduction prevention device according to the present invention.

FIG. 2 is a block diagram showing a first configuration example of an electronic equipment system implementing an unauthorized-reproduction prevention device according to the present invention. Here, it is assumed that an electronic equipment system 130 can connect to a contents providing system 100 and a program information registration and providing system 120 through data transfer means 110. The program information registration and providing system 120 accepts, for each program content, the registration of a program identifier, a program start date and time, and a program delivery method from a content supplier and keeps the information. The program identifier is a combination of symbols, such as alphanumeric characters, that is assigned to a program content so that the program content can be uniquely specified. A character sequence composed of a combination of a channel and a program start date and time can also be treated as a program identifier if a content to be delivered can be uniquely specified by designating the channel and the program start date and time. The program delivery method is information indicating which type of delivery is the delivery method, downloading delivery (non-real time delivery), or any one of streaming delivery and delivery using a broadcast signal (real time delivery). In the case of the downloading delivery or the streaming delivery, information about the URL of a program content can also be included as the information specifying the delivery method. In the case of the broadcasting, the program delivery method includes information about the frequency of a carrier and the type of a broadcasting medium, such as terrestrial digital broadcasting, broadcasting satellite (BS) digital broadcasting, or community antenna television (CATV). If a plurality of modulation/demodulation schemes can be used for the same broadcasting medium, it is sufficient to allow the program delivery method to include information about a modulation/demodulation scheme. Hereinafter, a more detailed description will be given.

The contents providing system 100 includes a non-real time delivery providing system 101 and a real time delivery providing system 102 and corresponds to the contents providing system 10 in FIG. 1. In the following description, it is assumed that file downloading delivery is used as non-real time delivery method and streaming delivery is used as real time delivery method. Accordingly, the non-real time delivery providing system 101 serves as a download server, and the real time delivery providing system 102 serves as a streaming server. A program content is associated with any one of these servers 101 and 102 in accordance with the information about the program delivery method registered with the program information registration and providing system 120.

The data transfer means 110 corresponds to the network 30 in FIG. 1. The data transfer means 110 may be any one of an IP network and a broadcasting network that transmits a content by using a broadcast signal, such as a terrestrial, BS, or CATV network. In the case of an IP network, the network may be one in which a band to be used in the network can be secured in advance, or may be one in which a band to be used in the network cannot be secured in advance.

The program information registration and providing system 120 corresponds to the program information registration and providing system 20 in FIG. 1 and has functions of receiving an input of program information as described above from a content supplier, keeping the program information, and distributing the program information to an external.

The electronic equipment system 130 corresponds to the content reproduction device 40 in FIG. 1. The electronic equipment system 130 makes a non-real time delivery reception schedule based on program information received from the program information registration and providing system 120 and also reproduces a content received from the contents providing system 100.

A data transfer interface 131 corresponds to the transceiver section 41 in FIG. 1 and is an interface between the electronic equipment system 130 and the data transfer means 110 such as an external communication network or broadcasting network. In the case where the data transfer means 110 is an IP network, the data transfer interface 131 has a termination function on a communication-related layer such as a function of terminating an Ethernet™ frame and a function of terminating an IP packet, and performs communication processing in accordance with a protocol used on that layer. This makes it possible that each application transfers information through the IP network by using Ethernet™, TCP/IP protocol, or UDP/IP protocol. On a physical layer, an interface according to an external environment is provided. For example, assuming that the electronic equipment system 130 is connected to the data transfer means 110 by ADSL, the interface on the physical layer has a function of terminating an ADSL signal. If connected to the data transfer means 110 by optical fiber, the interface on the physical layer has a function of terminating an optical signal. In the case of being connected by an Ethernet™ cable, the Ethernet™ physical layer is used.

A program information reference section 133 corresponds to the program information reference section 47 in FIG. 1. The program information reference section 133 refers to the program information registration and providing system 120, acquires program information including a program identifier, program start time, and program delivery method, and stores necessary information.

A real time delivery reception section 134 corresponds to the real time data reception section 42 in FIG. 1 and receives streaming packets from the real time delivery providing system 102 through the data transfer interface 131.

A non-real time delivery reception section 135 corresponds to the non-real time data reception section 44 in FIG. 1. Through the data transfer interface 131, the non-real time delivery reception section 135 accesses the download server of the non-real time delivery providing system 101 and performs processing for downloading a program content.

A date and time reference section 136 corresponds to the date and time reference section 49 in FIG. 1 and outputs date and time information (current time information) to a control section 138a, a reproduction control section 138b, and a non-real time delivery reception scheduler 141.

A content storage section 137 corresponds to the content storage section 45 in FIG. 1 and stores the file of a content downloaded by the non-real time delivery reception section 135. For the content storage section 137, a recording medium capable of storing data can be used, such as a hard disk, DVD disk, semiconductor memory, or magnetic tape.

A content output section 139 corresponds to the content output section 43 in FIG. 1. The content output section 139 receives as input a downloaded file stored in the content storage section 137 or data delivered in real time from the real time delivery reception section 134, converts the data into a signal in a format in which picture and sound can be reproduced, and outputs the signal to a reproduction device (not shown). In a case of picture reproduction, a display unit capable of reproducing and displaying a picture signal, such as a liquid crystal display, plasma display, CRT display, or organic electroluminescence display, may be connected to an output terminal of the content output section 139. However, a content is not limited to a picture signal but may be a sound signal or may take any other form.

An audience interface 140 is a display section or the like that displays required information and an operation section for allowing an audience to select a channel the audience wants to view then or to input a program the audience wants to view at a future moment.

The non-real time delivery reception scheduler 141 corresponds to the non-real time content reception scheduler 48 in FIG. 1. The non-real time delivery reception scheduler 141 references program information and current date and time information and performs scheduling to decide the order of downloading and the dates and times of downloading.

The control section 138a corresponds to the control section 46a in FIG. 1 and controls the transfer of information between each of the above-described functional blocks and manages an overall control flow, which will be described next. The reproduction control section 138b corresponds to the reproduction control section 46b in FIG. 1 and performs reproduction control such as reproduction inhibition and reproduction permission by using the content storage section 137 and date and time reference section 136. The control section 138a and reproduction control section 138b can be configured with a program-controlled processor such as a CPU that carries out a control flow by executing a computer program.

The control section 138a and the non-real time delivery reception scheduler 141 can acquire program information on each program content from the program information reference section 133 and can acquire current date and time information from the date and time reference section 136. Next, operations of the system using the above-described configuration will be described.

2.2) Program Information Acquisition Operation

First, a program content supplier registers with the program information registration and providing system 120 program information on a program, including the program identifier, program start time, and program delivery method, and uploads the content of the program at a URL (the real time delivery providing system 102 or non-real time delivery providing system 101) that is specified by the program delivery method. Making access to the program information registration and providing system 120 through the data transfer interface 131, the electronic equipment system 130 acquires and keeps the program information, which will be described below.

Figure 3:
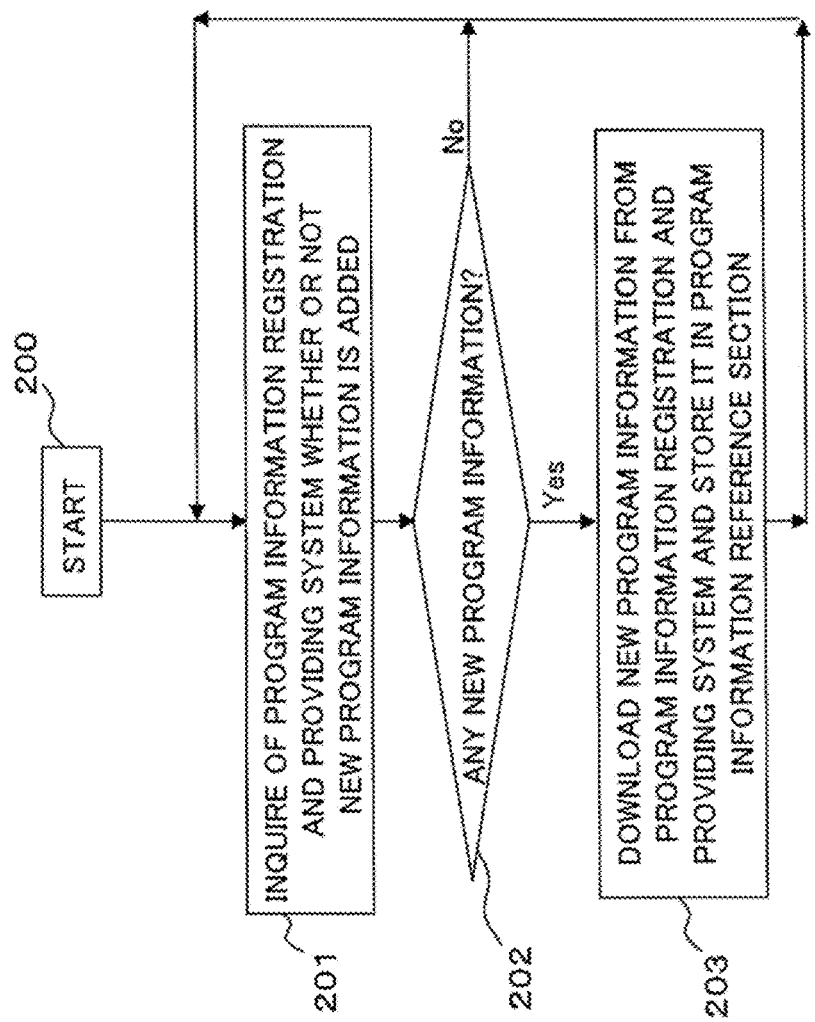
FIG. 3 is a flowchart showing a procedure of program information acquisition in the electronic equipment system shown in FIG. 2.

FIG. 3 is a flowchart showing a procedure of program information acquisition in the electronic equipment system shown in FIG. 2. The electronic equipment system 130 inquires of the program information registration and providing system 120 whether or not there is any program information newer than the information the electronic equipment system 130 holds (Step 201). This inquiry is made periodically. When there is no new program information (Step 202: No), the process returns to Step 201, and inquiry is performed periodically. When there is new program information (Step 202: Yes), the electronic equipment system 130 downloads the new program information from the program information registration and providing system 120 through the data transfer interface 131 and stores the new program information in the program information reference section 133 (Step 202), and then the process goes back to Step 201.

In this manner, program information is accumulated in the program information reference section 133, whereby the program information can be referenced at high speed. However, it is also possible that each time a desire to grasp program information arises, the program information reference section 133 accesses the program information registration and providing system 120 and references the program information.

2.3) Scheduling (First Exemplary Scheduling)

When there is a program content that has not yet been downloaded among program contents for downloading delivery (hereinafter, referred to as download program contents), the non-real time delivery reception scheduler 141 schedules downloading of this program content, by referencing program start times and the current time. This will be described in more detail.

Figure 4:
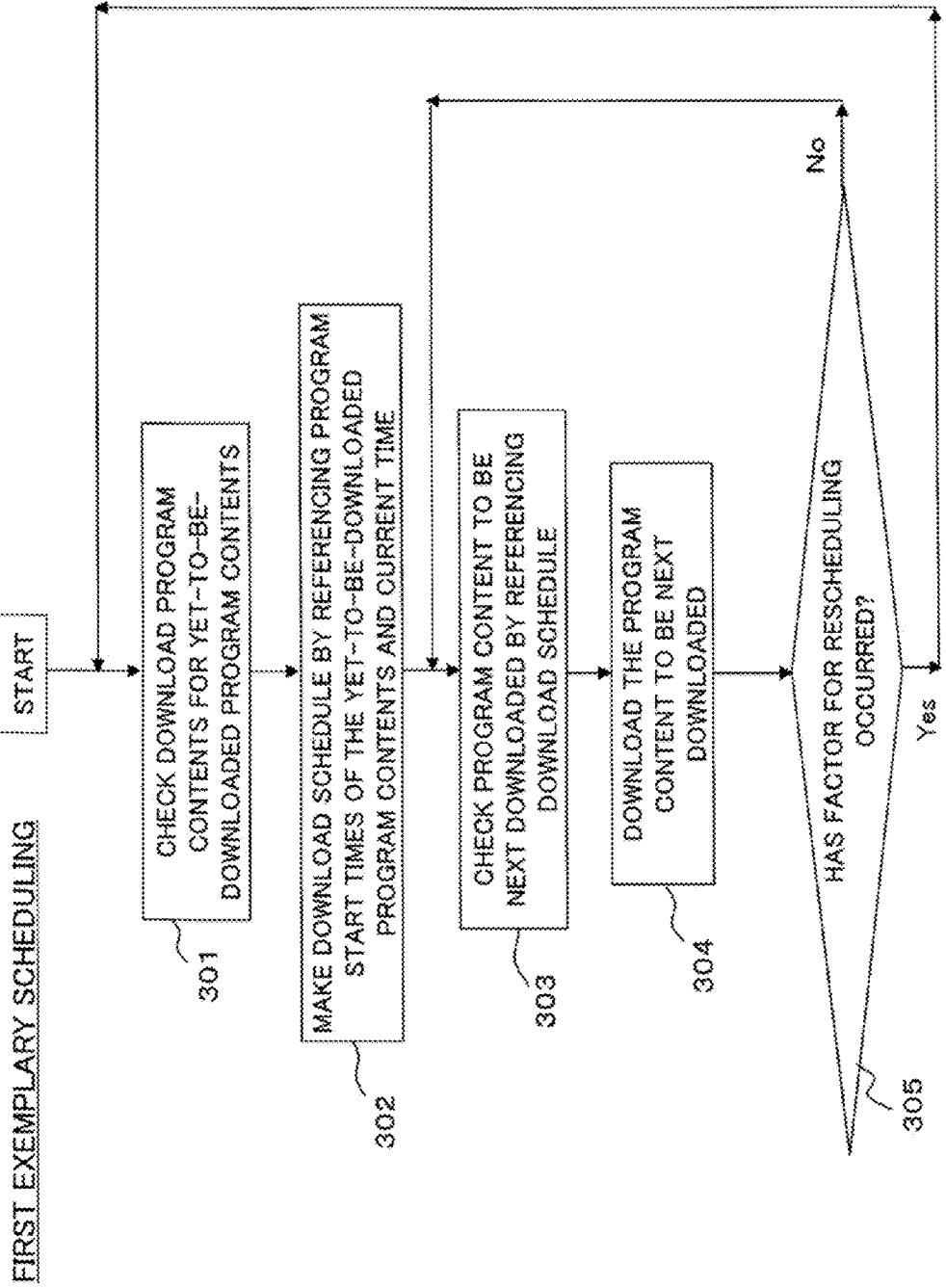
FIG. 4 is a flowchart showing a first exemplary scheduling operation carried out by a non-real time delivery reception scheduler of the electronic equipment system shown in FIG. 2.

FIG. 4 is a flowchart showing a first exemplary scheduling operation carried out by the non-real time delivery reception scheduler of the electronic equipment system shown in FIG. 2.

First, the control section 138a determines whether or not, of the download program contents, there is any one that has not yet been downloaded (Step 301). For example, by keeping a history of past downloading, the control section 138a can make the determination by comparing program information from the program information reference section 133 with the history.

When there is at least one download program content that has not yet been downloaded, the control section 138a controls the non-real time delivery reception scheduler 141 to allow it to schedule downloading (Step 302). Specifically, the non-real time delivery reception scheduler 141 references the current time from the date and time reference section 136 and references the program start times of the yet-to-be-downloaded program contents from the program information reference section 133, thereby deciding the download start time of each yet-to-be-downloaded program content and/or the order of downloading. For example, in the case of deciding only the order of downloading, it is sufficient that the non-real time delivery reception scheduler 141 compares the current time and each program start time and makes a download schedule such that the downloading of a program content is started in order of the proximity of the program start time to the current time.

Based on the download schedule made in Step 302, the non-real time delivery reception scheduler 141 determines whether or not there is a program content to download (Step 303). When there is a program content to download, the non-real time delivery reception scheduler 141 requests the non-real time delivery providing system 101 (download server) to download the program content, whereby the file of the program content is downloaded (Step 304). The downloaded file is stored in the content storage section 137 until the file is no longer needed. Conceivable cases of the file being no longer needed include, for example, a case where a audience does not desire to retain a program content after the reproduction of the program content is completed, a case where a content supplier prohibits retention, and the like.

Subsequently, the non-real time delivery reception scheduler 141 checks whether or not a factor for rescheduling has occurred (Step 305). When no factor has occurred (Step 305: No), the process returns to Step 303 and moves on to the next downloading as scheduled. When a factor for rescheduling has occurred (Step 305: Yes), the process goes back to Step 301 to perform rescheduling. Conceivable factors for rescheduling include an increase in the number of programs to be downloaded recognized upon acquisition of new program information, a decrease in the transfer rate due to a network failure or the like, the completion of downloading of all the download program contents scheduled, and the like. The control and management of these flows are performed by the control section 138.

Note that in a case where scheduling to decide the download start times is performed in Step 302 in FIG. 4, the non-real time delivery reception scheduler 141 compares the current time and each download start time decided in the scheduling. If the current time is in proximity to a download start time, preparation for downloading is made so that the downloading of the program content in question can be started at the download start time. Thereby, it is possible to start downloading at the download start time without delay (Step 304).

2.4) Content Output Control

Next, a description will be given of a procedure of control in the electronic equipment system 130 for appropriately outputting a reproduction signal of a program content in accordance with the program information in a situation where non-real time delivery and real time delivery coexist.

Figure 5:
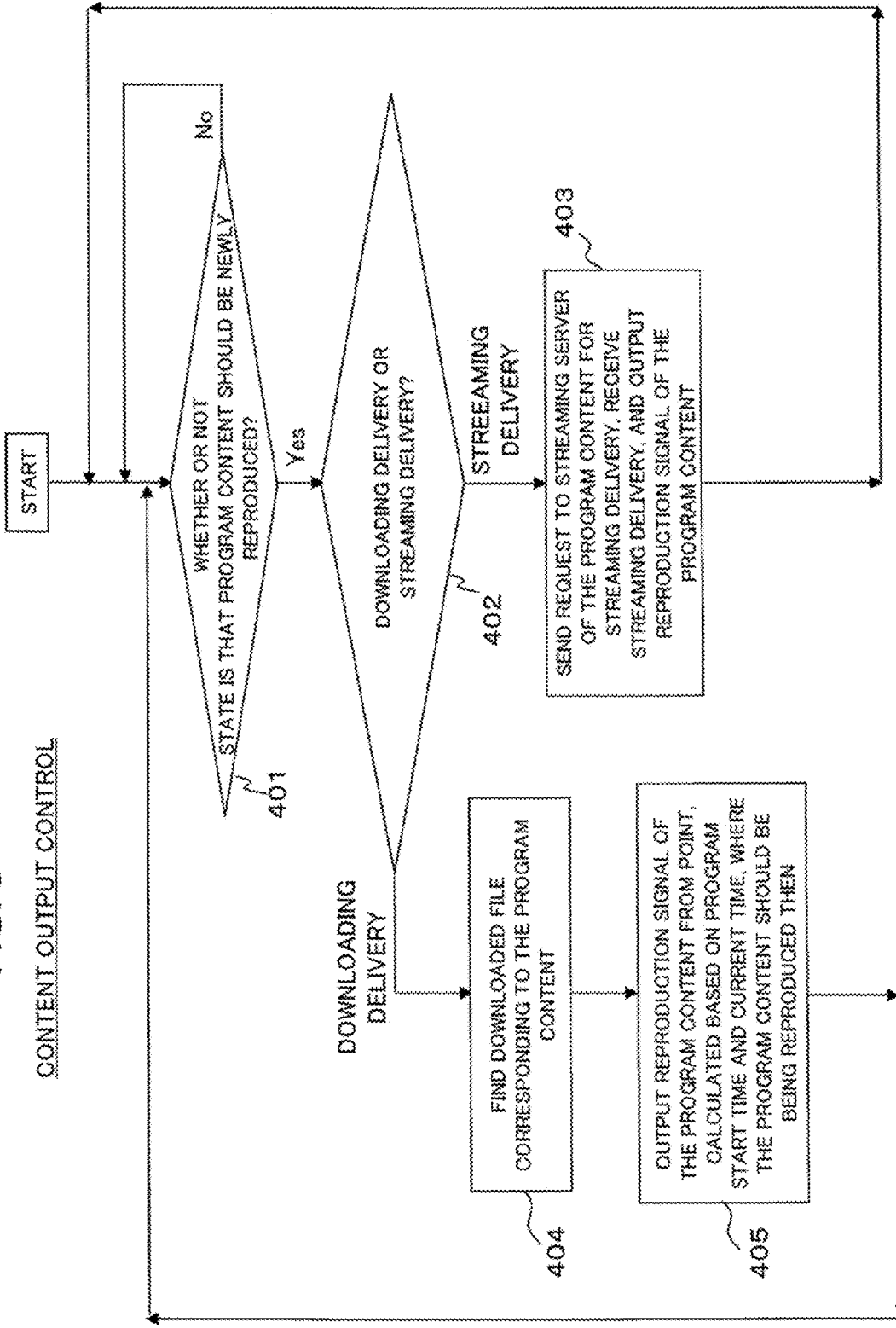
FIG. 5 is a flowchart showing a procedure of content output control in the electronic equipment system shown in FIG. 2.

FIG. 5 is a flowchart showing a procedure of content output control in the electronic equipment system shown in FIG. 2. First, the control section 138a references program information in the program information reference section 133 and checks whether or not the state is that a program content should be newly reproduced (Step 401).

When the state is that a program content should be newly reproduced (Step 401: Yes), it is determined, by referencing the program information, which one of downloading delivery and streaming delivery is the program delivery method for this program content (Step 402).

In the case of streaming delivery, under the control of the control section 138a, the real time delivery reception section 134 sends a request to the real time delivery providing system 102 for streaming delivery and receives a streaming signal through the data transfer interface 131. The real time delivery reception section 134 performs signal processing on the received streaming signal and then outputs it to the content output section 139. The content output section 139 converts the input signal into a content reproduction signal and outputs it to an external reproduction device (Step 403).

On the other hand, when the program content to be reproduced is one for file downloading delivery in Step 402, the reproduction control section 138b retrieves the file of the program content to be reproduced from the content storage section 137 where downloaded files are stored (Step 404), and outputs the file to be reproduced as a content reproduction signal through the content output section 139 (Step 405). In this event, by referencing the current time and the program start time of this program content, the period of time elapsed from the program start time until the current time can be calculated. If the elapsed period of time is known, since a portion of the program content that should have been already reproduced can be calculated, the reproduction of the program content can be begun from the point where the program should be being reproduced at the current time.

Note that in the procedure described above, used at Step 405 in FIG. 5 is the method in which, with consideration given to the period of time elapsed from the program start time, the point where the program should be being reproduced at the current time is calculated, and the reproduction of the program content is begun from that point. However, a method can also be used in which the reproduction is made from the beginning of the program content.

2.5) First Exemplary Content Reproduction Determination

Next, a description will be given of a method for performing the above-mentioned determination as to whether or not the state is that a program content should be newly reproduced (Step 401 in FIG. 5).

Figure 6:
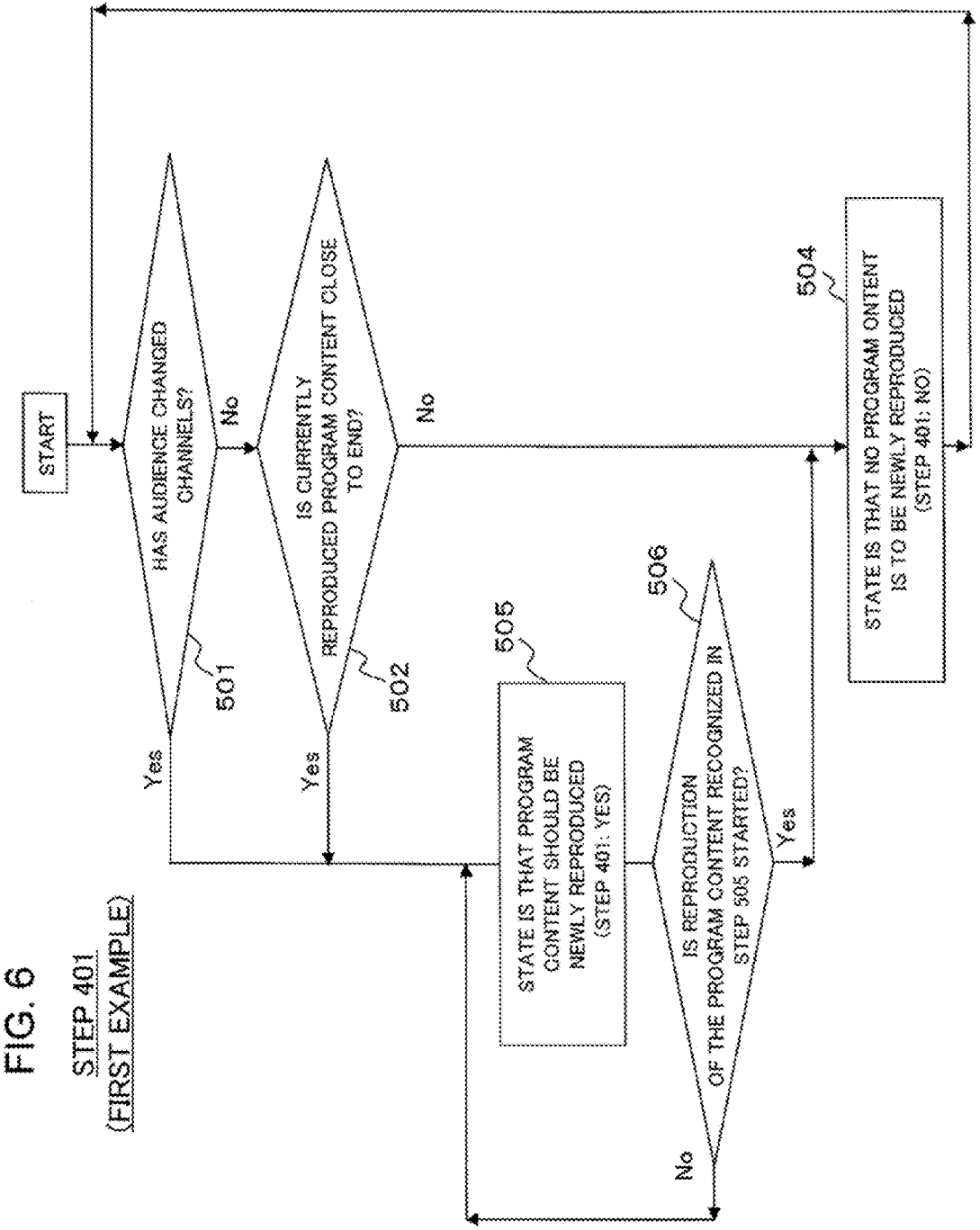
FIG. 6 is a flowchart showing a first exemplary procedure of content reproduction determination in the electronic equipment system shown in FIG. 2.

FIG. 6 is a flowchart showing a first exemplary procedure of content reproduction determination in the electronic equipment system shown in FIG. 2.

When an audience changes channels from the one that the audience is currently viewing to another through the audience interface 140 (Step 501: Yes), it is determined that the state that a program content should be newly reproduced has been brought about (Step 505). Subsequently, it is determined whether or not the reproduction of the program content is started (Step 506). The state that a program content should be newly reproduced does not end until the reproduction of the program content is started (Step 506: No). When the reproduction of the program content has been started (Step 506: Yes), the state changes to the state that no program content is to be newly reproduced (Step 504).

When the audience does not change channels (Step 501: No), the reproduction control section 138b checks whether or not the program content that is currently being reproduced is close to the end (Step 502). If the currently reproduced program content is close to the end (Step 502: Yes), since it is required to prepare for a program content to be reproduced, the state that a program content should be newly reproduced is brought about (Step 505). When the currently reproduced program content is not close to the end (Step 502: No), the state is that no program content is to be newly reproduced (Step 504).

When the state that a program content should be newly reproduced is brought about in the above description with FIG. 6, the process goes back to the "Yes" flow at Step 401 in FIG. 5, and the determination of downloading delivery or streaming delivery is made (Step 402), followed by the reproduction of the program content (Step 403 or Steps 404 and 405).

2.6) Effects

With a configuration and method as described above, in a system in which a program content having a fixed program start time is viewed, a audience can view a content delivered by using a network in real time or in non-real time, without being conscious of the delivery method, with a similar sense that the audience has in the case of general television broadcasting.

Moreover, the following effects can be obtained by adopting non-real time delivery such as downloading delivery. In the non-real time delivery, since the reproduction rate and transfer rate of a file are independent of each other, it is possible to transfer a content having a reproduction rate higher than the transfer rate. In the real time delivery, although a program content can be delivered only at a rate not higher than the transfer rate, the use of the present system makes it possible to broadcast or transfer a content with higher definition than one achieved by hitherto real time delivery. In this event, a non-real time delivery reception schedule is made by referencing program start times and the current time, whereby it is possible to have the receipt of a non-real time delivery completed before the program start time. Thereby, it is possible to reproduce a content having a reproduction rate higher than the transfer rate.

Further, in a network in which a band is not assigned in advance, such as the Internet in which band control cannot be performed between terminals because communications travel across multiple networks operated by different administrators, since the downloading of a download program content can be completed before the program start time, only the traffic of a streaming program content occurs even when a need arises for delivery of the streaming program content while the download program content is being reproduced. Accordingly, in the entire network, it is possible to reduce the used amount of the network band resource during real time delivery, allowing the saved network band resource to be used for other applications. Moreover, since the network band is not fully occupied, it is possible to stably receive streaming delivery without congestion.

As another effect, when channels are changed, the fact that a program content for non-real time delivery has been delivered before the program is started saves setting up a communication and buffering a required amount of a content prior to the start of reproduction, which are performed in the case of real time delivery. Accordingly, when channels are changed, a user can reduce the amount of time the user spends in waiting before he/she starts viewing a program.

Note that if the non-real time delivery reception scheduler or equivalent means is provided on the contents providing system 100, scheduling is performed without considering other contents providing systems, with the possible result that a schedule enabling every non-real time delivery to be completed before the program start time cannot be made.

On the other hand, according to the system shown in FIG. 2, the non-real time delivery reception scheduler 141 is provided not on the contents providing system 100 but to the electronic equipment system 130 on the content receiving side. The program information reference section 133 accesses the program information registration and providing system 120, whereby program information on other channels can be acquired. Thus, the electronic equipment system 130 can make a non-real time delivery reception schedule with consideration given to the other channels' programs for non-real time delivery. Accordingly, it is possible to avoid a situation in which a sufficient communication band for downloading of a program content cannot be secured due to an overlap with the download time of another channel's content and, consequently, the downloading of the program content cannot be completed by its program start time.

3. Second Exemplary Scheduling

As shown at Step 302 in FIG. 4 described above, the non-real time delivery reception scheduler 141 schedules downloading by referencing program start times and the current time. However, as another scheduling method, it is also possible to use a download period (a period of time required for a program content to be downloaded) for scheduling, by estimating the download period based on a usable bandwidth in a network, the state of a downloading delivery server, and the file size of a file to be downloaded. In this case, the program information registration and providing system 120 additionally includes information about the file size of a program content in the program information to be registered by a program supplier.

Accordingly, information about the program start time and file size of a yet-to-be-downloaded program content can be referenced by the program information reference section 133 making access to the program information registration and providing system 120. In this event, if the acquired program information is stored in the program information reference section 133, re-access will not need to be made. The current time can be acquired by referring to the date and time reference section 136.

Note that, not the file size itself, information from which the file size can be calculated may be registered. For example, if the reproduction rate and the duration of a program are registered, the file size can be calculated by their product. For example, in a case where the video signal of a one-hour program is reproduced at a reproduction rate of 40 Mbps, the file size is 144 Gbit (=40 Mbps×3600 sec).

If the file size and the transfer rate are known in this manner, the download period can be estimated. Specifically, the estimated value of a download period can be calculated by dividing the file size of a program content by the transfer rate. For example, if the file size is 144 Gbit and the transfer rate is 4 Mbps, then the download period is 10 hours (=144 Gbit/4 Mbps). The transfer rate can be measured by, for example, transmitting a test signal to a server and measuring the length of time taken to receive a response signal from the server.

If the download period is estimated, it is possible to adopt, as a method for scheduling downloading, a procedure of preferentially downloading a content that has the earliest time which will be its download period away from the current time. For example, assuming that the program start time of a program E is found to be 23:00 on Dec. 18, 2007 by referring to the program information reference section 133 and that the download period of the content of the program E can be estimated at 10 hours, then it is necessary to start downloading the content by 13:00 on Dec. 18, 2007. In addition to this, assume that the similarly calculated time to start downloading the content of another program F is 23:10 on Dec. 18, 2007. In this case, the non-real time delivery reception scheduler 141 can decide the order of downloading such that the program E is first and then comes the program F. Hereinafter, a description will be given of the scheduling using the estimated value of a download period, with reference to FIG. 7.

3.1) Scheduling Using Estimated Download Period

Figure 7:
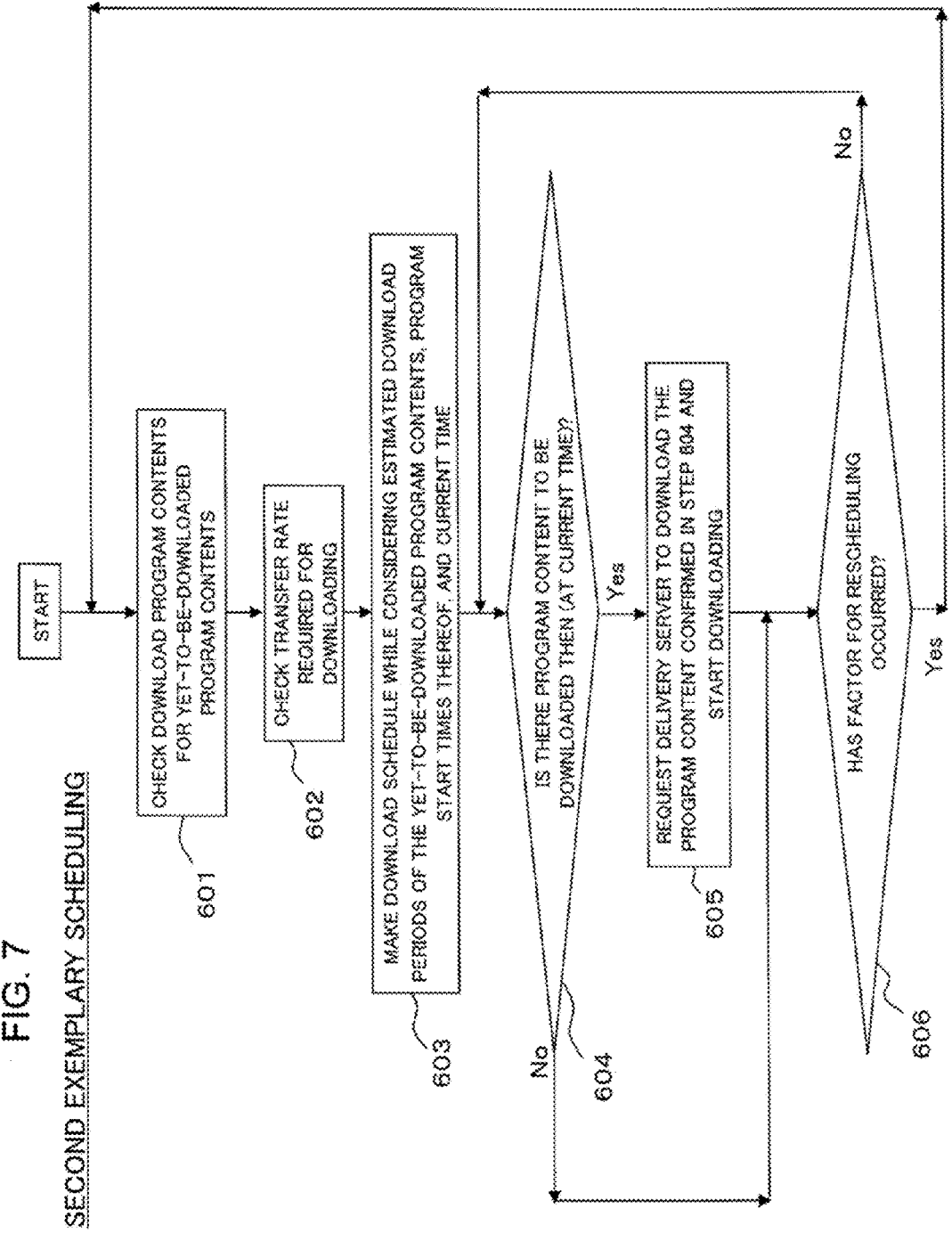
FIG. 7 is a flowchart showing a second exemplary scheduling operation carried out by the non-real time delivery reception scheduler of the electronic equipment system shown in FIG. 2.

FIG. 7 is a flowchart showing a second exemplary scheduling operation carried out by the non-real time delivery reception scheduler of the electronic equipment system shown in FIG. 2.

First, the control section 138a determines whether or not, among download program contents, there is any one that has not yet been downloaded (Step 601). When there is at least one yet-to-be-downloaded program content, the control section 138a checks the transfer rate required to download the program contents in question (Step 602).

The transfer rate may be measured by actually accessing a server. However, actual measurement does not need to be performed, but if the transfer rate from a server is known in advance from the contract with a network provider or the like, such a known transfer rate can be used. Moreover, even in the case of a network in which the transfer rate is not secured in advance, it is possible to use an average transfer rate calculated at a certain point of time. For example, the average of transfer rates obtained around a certain time on every certain day of week is statistically calculated in advance, and this average value is used.

Next, the non-real time delivery reception scheduler 141 refers to the program information reference section 133 for the file sizes of the content programs to be downloaded and estimates the download period of each of these download program contents by using the obtained transfer rate. Then, referencing the program start times and current time, the non-real time delivery reception scheduler 141 decides the priority order of downloading the download program contents and/or the download start times (Step 603). For example, in the case where the download start times are decided as scheduling, the non-real time delivery reception scheduler 141 references the current time and the schedule and checks whether or not there is any program to download at that point of time (Step 604). When there is a program to download (Step 604: Yes), the non-real time delivery reception scheduler 141 starts downloading the program content in question (Step 605). Then, after starting downloading, the non-real time delivery reception scheduler 141 constantly checks whether or not a factor for rescheduling has occurred (Step 606). Conceivable factors for rescheduling include an increase in the number of programs to be downloaded recognized upon acquisition of new program information, a decrease in the transfer rate due to a network failure or the like, the completion of downloading of all the download program contents scheduled, and the like.

Note that although the constant checking in Step 606 is performed upon start of the downloading in Step 605 here, the process may move to the next step after the downloading is completed in Step 605.

3.2) Effects

As described above, downloading is scheduled with knowledge of the usable transfer rate (usable bandwidth in a network), whereby it is possible to make a more accurate and reliable schedule that enables the downloading of a program content to be completed before the program start time.

Moreover, there is another effect that more efficient downloading can be performed. For example, assuming that there are many channels performing no streaming delivery during the late-night hours, the network band is unoccupied during the late-night hours. Accordingly, a schedule is made such that many contents are downloaded during the late-night hours and few contents are downloaded during the daytime hours, whereby it is possible to efficiently use the network. Additionally, precision can be enhanced in estimation of the average value of usable bandwidth in the network on a certain day of week or a certain date of year and/or at a certain time is of day by keeping the measured values of usable bandwidth in the network on the certain day of week or certain date of year, and/or at the certain time of day. For example, assuming that traffic is heavy at 10 o'clock on Mondays, a download schedule can be made such as to avoid that time.

As another method of scheduling to decide the download start times, the download start times are decided by estimating the time when the network band is unoccupied, not on a periodic-fixed-time basis, but at random, every time a certain event takes place, or at combinational times thereof.

As described above, during the reproduction of a program delivered by downloading, a band in the network is not consumed by streaming at least with respect to this program. Therefore, if a download schedule is made such that downloading is performed by using this unused band, the network band resource can be efficiently used, making it easier to have the downloading of a program content completed by its program start time, resulting in less time of day in which the network is unoccupied. The available bandwidth that can be used for downloading can be calculated by subtracting the sum of the reproduction rates (transfer rates) of program contents that are being delivered then in real time from the transmission rate.

4. Third Exemplary Scheduling

Figure 8:
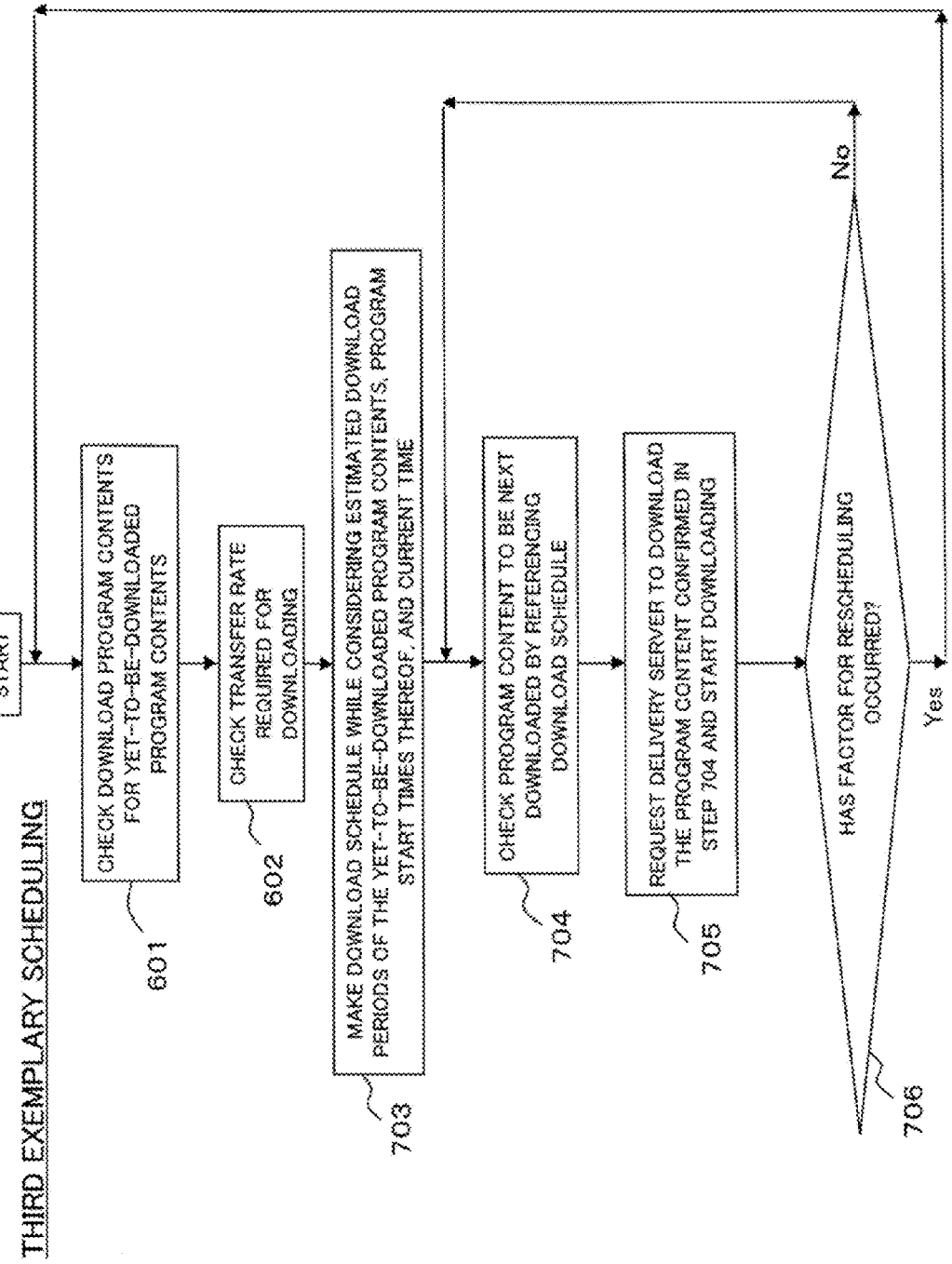
FIG. 8 is a flowchart showing a third exemplary scheduling operation carried out by the non-real time delivery reception scheduler of the electronic equipment system shown in FIG. 2.

FIG. 8 is a flowchart showing a third exemplary scheduling operation carried out by the non-real time delivery reception scheduler of the electronic equipment system shown in FIG. 2. However, Steps 601 and 602 are similar to those of the second exemplary scheduling operation shown in FIG. 7, and therefore a description thereof will be omitted.

Referring to FIG. 8, after the transfer rate is obtained in Step 602, the non-real time delivery reception scheduler 141 refers to the program information reference section 133 for the file sizes of program contents to be downloaded, and estimates the download period of each of these download program contents by using the transfer rate obtained in Step 602. Then, it is assumed that only the order of downloading the download program contents is decided by referencing the program start times and current time (Step 703). In this case, a program content to be next downloaded is checked (Step 704), and then the downloading of the program content is carried out (Step 705).

Here, the process moves to the next step after the downloading is completed at Step 705 in FIG. 8. However, the process may move to the next step upon start of the downloading, as described at Step 305 in FIG. 4.

As another method with respect to downloading and scheduling, rescheduling may be performed at the point when the downloading of the file of one program content is completed.

Moreover, a schedule may be made such that next downloading is performed when current downloading is completed up to a certain point. For example, a schedule can be made such that next downloading is performed when 90% of the file size of a current program content has been downloaded.

5. Fourth Exemplary Scheduling

It is possible to use a network more efficiently by allowing a band for real time delivery to be used for non-real time delivery when there are only a small number of programs for real time delivery, and allowing a band for non-real time delivery to be used for real time delivery when there are a large number of programs for real time delivery.

For example, at a certain time, the non-real time delivery reception scheduler 141 refers to the program information reference section 133, thereby grasping the number of programs for real time delivery. It is assumed that there are program contents for real time delivery having reproduction rates of 1 Mbps, 20 Mbps, and 40 Mbps, respectively. In this case, the total of the required transfer rates is the sum of these reproduction rates, 61 Mbps. Therefore, assuming that a 100-Mbps optical line is now used as an access line, at least 39 Mbps can be used for downloading at that point of time. Moreover, assuming that there are only program contents for real time delivery having reproduction rates of 1 Mbps and 4 Mbps at another point of time, at least 95 Mbps can be used for downloading at the other point of time. Note that as a smaller number of programs are actually being delivered in real time at a certain point of time, a larger bandwidth can be used for downloading. For example, even if programming is made to perform 4-Mbps and 1-Mbps real time deliveries as described above, as large a bandwidth as 99 Mbps can be used for downloading when only the 1-Mbps program is actually delivered in real time for viewing. In scheduling of downloading (non-real time delivery), an optimum schedule can be made if scheduling is performed with consideration given to the ever-changing bandwidth usable for downloading, by referencing the programming of real time programs, the state of the communication bands in use for real time delivery, and the like.

6. Fifth Exemplary Scheduling

If the download period can be estimated, it is also possible to use a method described below, as another method for scheduling downloading.

First, a schedule is made. When the downloading of all program contents is completed by their respective program start times owing to this schedule, then the schedule is ended. Otherwise, it is checked whether or not all goes well according to another conceivable schedule that is made by changing the download start times or the like. Then, while modifying the schedule, a schedule is found according to which all the program contents can be downloaded by their respective reproduction start times. Such a heuristic method may be used.

More specifically, assume that there are two programs G and H having download periods of 10 hours and 2 hours, respectively, and that the current time is 20 hours before the program start time of the program G and 5 hours before the program start time of the program H. In this case, for example, a schedule can be made such that the content of the program H is downloaded first (started at the current time) taking two hours, and after the completion of this downloading (two hours from the current time), the downloading of the content of the program G is started. If such a schedule is made, the downloading of both of the programs G and H can be completed by their respective program start times. In the above case, the downloading of both programs can be completed by the respective program start times even when the order of downloading the programs G and H is reversed.

As another case, assume that there are two programs I and J having download periods of 10 hours and 2 hours, respectively, and that the current time is 11 hours before the program start time of the program I and 13 hours before the program start time of the program J. If the program J is first downloaded, this downloading is completed 9 hours before the program start time of the program I, with the result that the downloading of the program I will not have been completed before the program start time of the program I, because the download period of the program I is 10 hours. Accordingly, another possible schedule is sought. If a schedule is made such that the downloading of the program I is started first (at the current time) and, after the completion of this downloading (10 hours from the current time), the content of the program J is downloaded for two hours, then the downloading of both of these programs I and J can be completed by their respective program start times. Accordingly, it is possible to decide to adopt the latter schedule.

Moreover, as a method for setting priorities in scheduling, a method can be used in which, with respect to a program content for downloading delivery, when the total bit rate of the reproduction rate of this program content in question and the transfer rates of other program contents to be delivered in real time at the time of reproducing the program content in question is close to the transmission rate, then the downloading priority of the program content in question is lowered because only a small bandwidth can be secured for downloading.

Furthermore, after download start times are decided, the order of downloading can also be decided if the download start times are rearranged in ascending order (earliest first). Accordingly, the method of deciding download start times can be applied to a method of deciding the order of downloading.

7. Other Scheduling Methods

A schedule may be made such that, with consideration given to the transmission rate and transfer rate when downloading is performed, a plurality of downloads are performed in parallel. For example, a download schedule is feasible in which two downloads each at a transfer rate of 4 Mbps can be concurrently performed through a transmission line with a transmission rate of 8 Mbps.

As described above, a schedule is not necessarily made such that one file is downloaded at a certain time, but can be made such that a plurality of files are concurrently downloaded. This is because there is no problem if the downloading throughput of a server and that of a non-real time delivery reception section of an electronic equipment system, as well as network traffic, are enough to process a plurality of downloads concurrently.

If an appropriate download schedule is made according to the first exemplary scheduling shown in FIG. 4, all of the programs for downloading delivery will have been downloaded by their respective program start times. However, should a program content fail to have been downloaded, the reproduction of this program content may be performed while the file of this program content is being downloaded through the non-real time delivery reception section 135 (progressive downloading) if the transfer rate is higher than the reproduction rate of the program content in question.

Furthermore, it is also possible to use a method in which rescheduling is performed depending on the progress of downloading, by concurrently running a process of managing a schedule and a process of managing the progresses of downloading of individual contents. For example, in one method, once a schedule is made, downloading is performed according to the schedule until the downloading of all program contents is completed according to the schedule. Thereafter, scheduling is performed again.

Further, in a case of using a method in which a audience makes in advance a marking on a program that the audience wants to view, it is possible to use a method, as an alternative to the method of scheduling downloading at Step 302 in FIG. 4, Step 603 in FIG. 7, Step 703 in FIG. 8, or the like, in which setting is made such that a program with the to-be-viewed marking made thereon is preferentially downloaded.

Moreover, when the bandwidth usable for downloading is reduced due to a network failure or the like while downloading is being performed according to schedule, priority is placed on those real time deliveries that are being made then, by stopping the downloading job that may hinder the real time deliveries, whereby no disturbance occurs in the programs then viewed. Thereafter, if the downloading job is only temporarily stopped, the remaining subsequent downloading may be performed according to the then schedule, or a download schedule may be remade with consideration given to the then band status.

No matter whether rescheduling is performed or is not performed depending on the network status, download software can be used that enables downloading to be temporarily stopped and resumed. In this case, it is possible to perform download management in which downloading is temporarily stopped when network traffic has become heavy and is resumed when the network traffic has become light. In this event, rescheduling may be performed at the stage where the downloading of a certain content is temporarily stopped. Alternatively, the downloading of this content is resumed, and rescheduling may be performed when the downloading of all contents is completed. That is, any stage of the progress of downloading may serve as a trigger for rescheduling.

In the above-described example, a method is illustrated in which downloading of program contents is scheduled by using the program start times of the program contents. However, the present example can also be applied to a case where a time zone having a certain time range is set as a program start time. For example, it is possible to allow a program start time to have a time range, such as a program start time between one o'clock and ten o'clock.

In addition, in the above-described example, a delivery is directly made from the contents providing system 100 to the electronic equipment system 130. However, it is also possible to set a sever (edge server) to be proxy for the contents providing system in the vicinity of the electronic equipment system 130 and allow the edge server to make a delivery.

Moreover, in the above-described example, the single program information registration and providing system 120 and the single content delivery system 100 are provided. However, the present example can be applied even if more than one of each of them are provided. Furthermore, in the above-described example, the program information registration and providing system 120 is placed in one location in a centralized manner. However, it is also possible to place the program information registration and providing system 120 in a distributed manner. The present example can be applied in any of a case of providing pieces of a single file that is divided and distributed, and a case of providing different files from different servers.

Further, in the above-described example, the client-server system is used as a system performing downloading. However, it is also possible that electronic equipment systems mutually download contents from each other by using, for example, peer-to-peer (P2P) technology. Thereby, the load on a system delivering a content can be distributed, and the download period can be reduced.

To implement the P2P downloading, it is sufficient to install P2P software in the electronic equipment system 130 or the content reproduction device 40 and allow the software to run thereon. The P2P software searches for a site from which a file can be downloaded, by using the program identifier that is assigned to the content as a key, and downloads the file. Alternatively, if a file is divided into pieces and retained at a plurality of sites in a distributed manner, the P2P software searches for such sites, downloads all the pieces of the file from the plurality of sites, and then combines the pieces to construct the file.

Information on a site in which a file with a certain program identifier is present can be collected by P2P software communicating with another P2P software. In this case, the download URL of a file, or the download URLs of the pieces of a file, corresponding to a program is kept by a P2P system (a site running P2P software, or a site managing such sites). Therefore, the program information registration and providing system 120 does not need to keep the URL(s) for the program. As another method, it is also possible to allow the program information registration and providing system 120 to keep information on the URL of a content. For example, a site (hereinafter, referred to as P2P management site) is established that is assigned to manage URLs where the files of contents, or the pieces of the files, are present. Then, it is sufficient that this P2P management site is designated as the URL of A program content the information on which is kept by the program information registration and providing system 120. Thereby, the electronic equipment system 130 can download a file, or the pieces of a file, by referring to the P2P management site. In this case, a system comprised of the P2P management site and the URL sites maintained by the P2P management system corresponds to the non-real time delivery providing system 101. In addition, when no P2P management site is provided, one of those sites that run P2P software is designated as the location of a program content, whereby the file of the program content can be downloaded eventually with the designated site as a starting point.

8. Second Exemplary Content Reproduction Determination

A description will be given of a second example of the above-mentioned determination as to whether or not the state is that a program content should be newly reproduced (Step 401 in FIG. 5). Here, an electronic program guide (EPG) is shown to a audience, a scenario of a program or programs to be viewed is created, and reproduction determination is made in accordance with the scenario. That is, a audience can gain knowledge of, for example, what program is scheduled to be broadcast on which channel at what time on what date (year, month, and date), by having a look at information kept by the program information reference section 133 through the audience interface 140. It is possible to allow the audience interface to function as an EPG, by using, for the audience interface, a configuration to display such program information on a screen. The audience can enter a to-be-viewed marking onto a program the audience wants to view through the audience interface 140. Here, a description will be given of a method of "determining whether or not the state is that a program content should be newly reproduced" in a case where a scenario of a program to be reproduced is created and the program is reproduced in accordance with the scenario.

Figure 9:
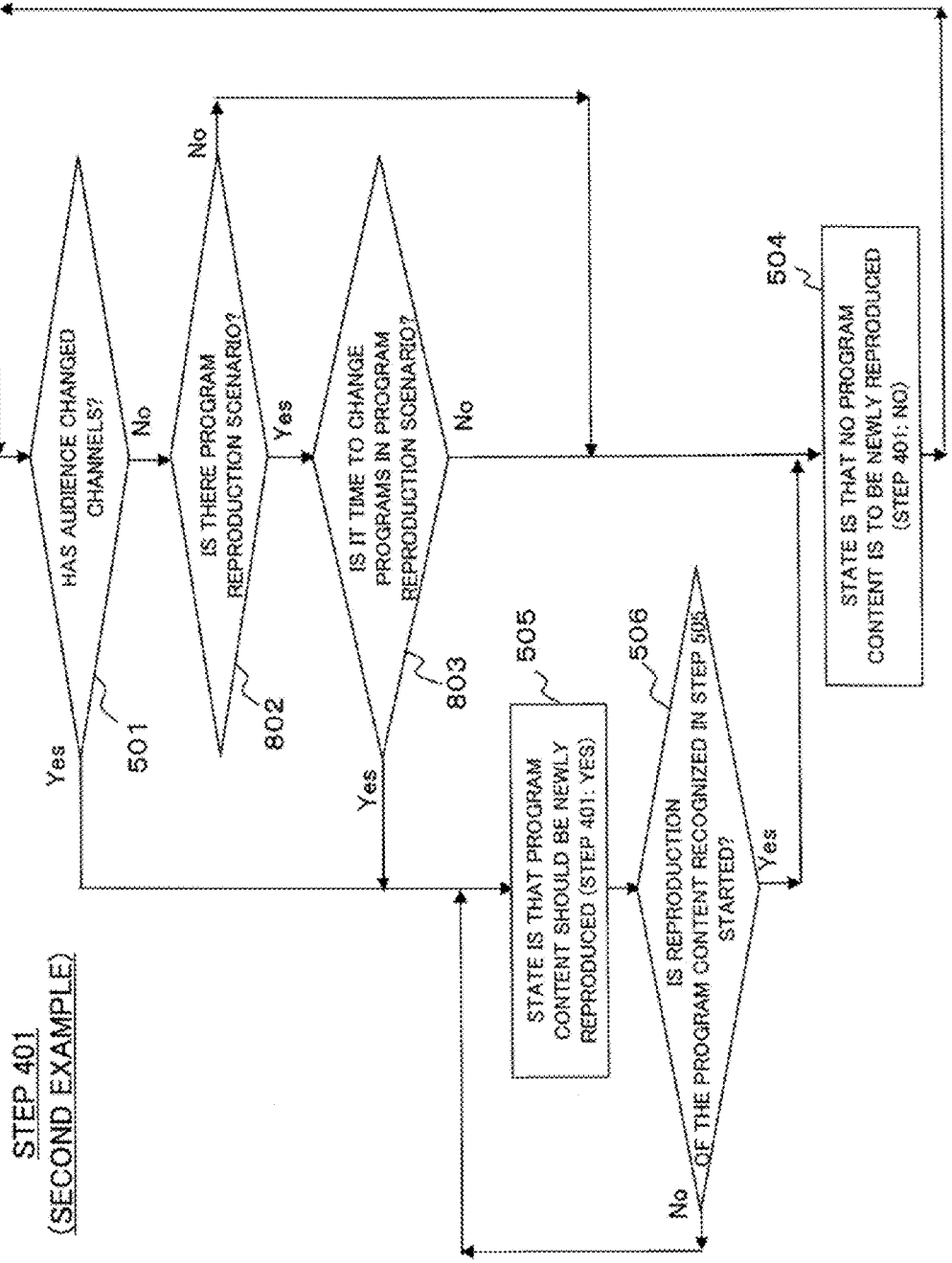
FIG. 9 is a flowchart showing a second exemplary procedure of content reproduction determination in the electronic equipment system shown in FIG. 2.

FIG. 9 is a flowchart showing a second exemplary procedure of content reproduction determination in the electronic equipment system shown in FIG. 2. However, steps similar to those of the first exemplary procedure shown in FIG. 6 are denoted by the same reference numerals in FIG. 6, and a description thereof will be simplified.

Referring to FIG. 9, it is checked whether or not a audience has changed channels (Step 501). When the audience has not changed channels (Step 501: No), the reproduction control section 138b checks whether or not a program reproduction scenario is registered previously (Step 802). However, even if a program reproduction scenario exists, a program that is newly switched to has priority of reproduction over a program determined in the scenario when the audience has changed channels. Thereby, it is possible to deal with a situation in which an audience comes to want to view a different program than a program determined in a program reproduction scenario.

Here, the program scenario refers to a time-basis plan of programs fixed to be reproduced, such as a plan in which on a certain date, a program content is to be reproduced at 10:00 and another program content on another channel is to be reproduced at 11:00. For example, with program information displayed on a screen, an audience makes a to-be-viewed marking on a program content the audience wants to view by operating the audience interface 140 (e.g., a remote controller), whereby a program reproduction scenario can be created. The to-be-viewed marking can be made in such a manner that a marking memory area is secured for a program identifier and that the bit value in the memory area is changed. By making a marking on a program that a audience wants to view, it is possible to automatically change channels to switch to the pre-registered program the audience wants to view.

In Step 802, when a program reproduction scenario exists (Step 802: Yes), the program reproduction scenario is referenced. If it is found as a result of the reference that it is not time to change programs (Step 803: No), the state is that no program content is to be newly reproduced (Step 504). If it is found, as a result of referencing the program reproduction scenario and comparing with the then time, that it is immediately before a next program is reproduced, then the state can be said to be that a program content should be newly reproduced, and therefore the process goes for "Yes" in Step 803. The then time can be found by referring to the date and time reference section 136. Then, once the program recognized in Step 505 is reproduced, as described earlier, the state that a program content should be newly reproduced ends (Step 506: Yes) to bring about the state that no program content is to be newly reproduced (Step 504).

Regarding the program reproduction scenario, in the above example, it is determined that no program reproduction scenario exists when a audience has not registered a scenario. However, as another method, if no scenario is registered, it is possible to assume a scenario in which when a currently reproduced program has come to the end, a next program on the current channel is reproduced.

In the above description with FIG. 9, when the state that a program content should be newly reproduced is brought about, the process goes back to the "Yes" flow at Step 401 in FIG. 5, and the determination of downloading delivery or streaming delivery is made (Step 402), followed by the reproduction of the program content (Step 403 or Steps 404 and 405).

Note that it is also possible to allow the electronic equipment system 130 to function as a program recording device. By making a to-be-recorded marking in advance on a program required to be retained, it is possible to retain the program having the marking, without deleting it from the content storage section 137 even after the reproduction of the downloaded program is completed. Moreover, with respect to program contents delivered by streaming as well, if a program content having a to-be-recorded marking is desired to be recorded similarly, it is sufficient to detect and store a stream of the bits reproduced through streaming.

When allowing the electronic equipment system 130 to function as a program recording device, a disk area for recording and a disk area for storing a program content downloaded by non-real time delivery are separated in advance. Thereby, a fixed storage capacity for non-real delivery is always secured, making it possible to avoid a situation in which the content storage section 137 for non-real time delivery is filled with unnecessary files.

According to the above-described first configuration example, it is not necessary to display in a program table (EPG) viewed by an audience whether a program content is one for real time delivery or one for non-real time delivery. That is, it is not necessary to make an audience conscious of whether a program content is one for real time delivery (streaming delivery or radio-wave broadcasting) or one for non-real time delivery (downloading delivery). Accordingly, there is an effect that those users unfamiliar with such technology (e.g., children) can use the system without problems.

In the above-described first configuration example, as a real time delivery method, a method using streaming delivery is shown. However, a system may be used that transmits and receives another type of broadcast signal, such as a signal of terrestrial digital broadcasting, satellite communication, satellite broadcasting, or CATV. For a system configuration in that case, a video signal transmitter is used for the real time delivery providing system 102 in FIG. 2, and a real time content is transmitted to the electronic equipment system 130 not by using a network but by using radio waves, or modulating a high-frequency electric signal flowing through a coaxial line (in case of CATV). In this case, the data transfer interface 131 of the electronic equipment system 130 is an interface including a receiver capable of receiving the broadcast radio waves and a means for reproduction processing of the broadcast signal. It is sufficient that the received signal is converted by the content output section 139 into a format in which a picture signal can be displayed.

Regarding the data transfer means 110, an IP network is used in the above-described example. However, the data transfer means 110 is not limited to the IP network. The present invention can be implemented with any networks as long as packets and/or frames are used in a network. For example, the data transfer means 110 may be an Ethernet™ network or may be an asynchronous transfer mode (ATM) network.

A description has been given of a configuration to deliver a content such as images as well as program information by using an IP network. However, also in a terrestrial digital system, broadcasting using a communication satellite, a satellite broadcasting system, a CATV system, or the like, if part of a broadcasting band is assigned as a band for downloading delivery, it is possible to perform downloading delivery by using the assigned hand. If a method is adopted in which a program content is delivered in advance by downloading in addition to real time broadcasting, it is possible to deliver a content that requires a bandwidth greater than the bandwidth allotted to a broadcast channel.

For example, in a case where only a band with a transfer rate of 20 Mbps is assigned to one broadcast channel, in general, a content with a reproduction rate greater than 20 Mbps cannot be delivered by broadcasting. However, if another 20-Mbps broadcasting bandwidth is used for non-real time delivery, it is possible to deliver the content with a reproduction rate greater than 20 Mbps. For example, in a case of a content with a program duration of one hour at a reproduction rate of 40 Mbps, it is sufficient to deliver the content by its program start time by taking two hours using a bandwidth for broadcasting with a transfer rate of 20 Mbps. The electronic equipment system 130 stores the content and reproduces it at the program start time.

Moreover, apart from the above method in which a different channel is provided for non-real time delivery, it is also possible to perform non-real time delivery on a real time delivery channel during a time of day when no real time broadcasting is performed on the real time delivery channel. For example, real time delivery is performed through a broadcast radio-wave channel from five o'clock in the morning until one o'clock in the night, and the same broadcast radio-wave channel is used for non-real time delivery from one o'clock in the night until five o'clock in the morning.

If such a broadcasting system is employed as the non-real time deliver providing system 101, there is an effect that the delivery of a content having a greater quantity of information per unit time can be performed without changing or renewing the existing broadcasting equipment for real time delivery. For example, assume that a broadcasting station having existing terrestrial digital equipment can only deliver a content with a reproduction rate of 20 Mbps. In order to deliver a 40-Mbps content, the broadcasting equipment requires renewal so as to be able to deliver a 40-Mbps content. However, in the case of using the present example, a content with a reproduction rate of 40 Mbps can be transferred if the file of the content is transferred by taking twice the time, by using the equipment capable of broadcasting a content with a reproduction rate of 20 Mbps at most. Accordingly, it is possible to deliver a content with a reproduction rate higher than the transfer rate without making a great change in or renewal of broadcasting equipment.

Moreover, a downloaded program content does not require real time delivery during its reproduction. Accordingly, it is possible to reduce the number of channels that should be broadcast during that time. Hence, during that time, more bands can be used for downloading, and/or an unoccupied band can be used for another application.

9. Second Configuration Example

As a second configuration example of the electronic equipment system, a system will be described that uses, as real time delivery methods, both of a method using streaming delivery and a method making delivery by radio-wave broadcasting or through cable by modulating a high-frequency electric signal such as CATV.

Figure 10:
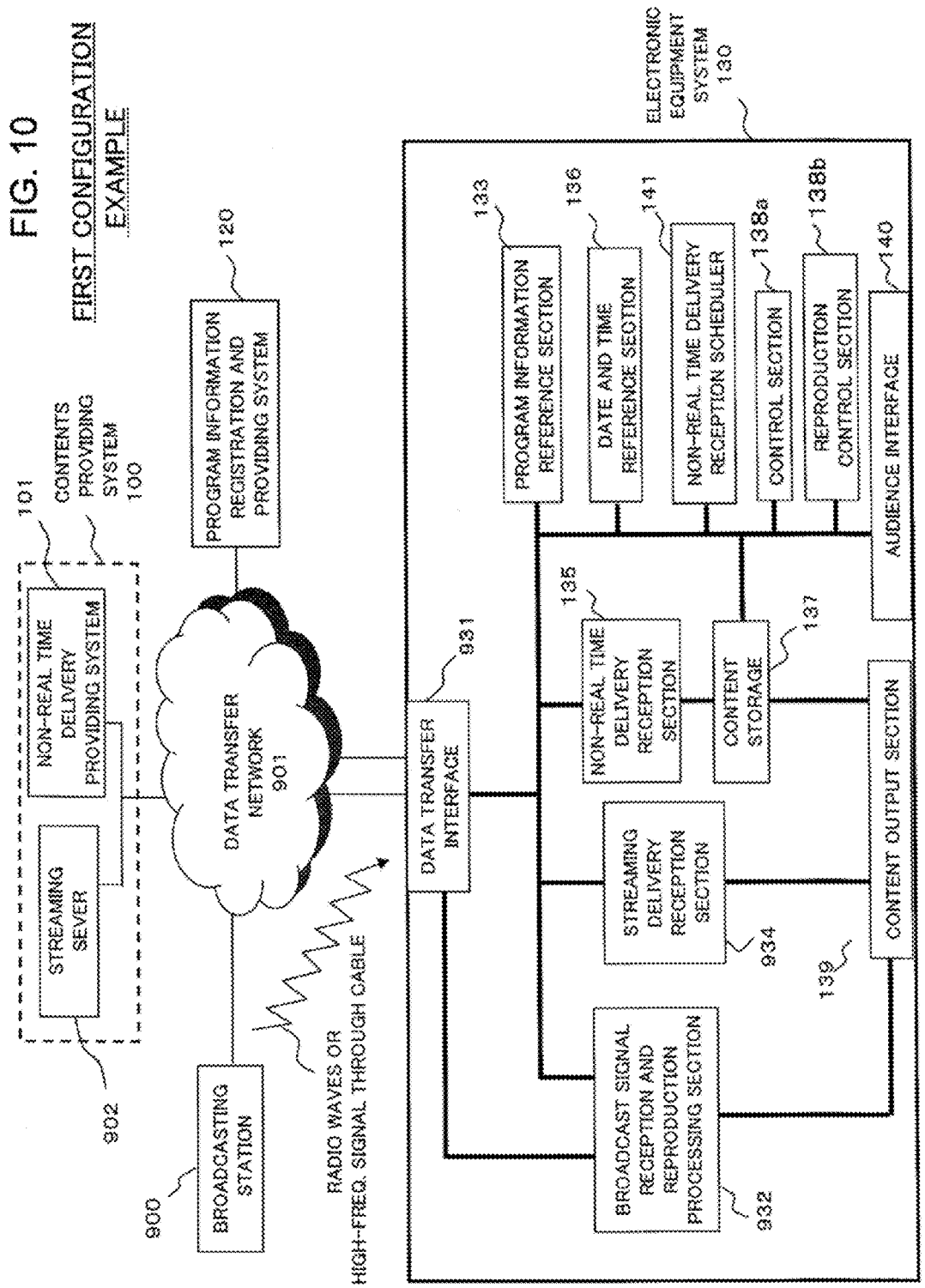
FIG. 10 is a block diagram showing a second configuration example of the electronic equipment system implementing an unauthorized-reproduction prevention device according to the present invention.

FIG. 10 is a block diagram showing the second configuration example of the electronic equipment system implementing an unauthorized-reproduction prevention device according to the present invention. Note that blocks having functions similar to those shown in FIG. 2 are denoted by the same reference numerals in FIG. 2, and a description thereof will be omitted where appropriate.

In the present configuration example, two types of real time delivery providing system are provided: a broadcasting station 900 and a streaming sever 902. The broadcasting station 900 has a function of transmitting a broadcast signal or CATV signal by modulating a high-frequency carrier based on a picture signal, regardless of whether transmission is made by radio or through cable. Moreover, for a data transfer network 901, an IP network or the like can be used.

A data transfer interface 931 of the electronic equipment system 130 has a reception function of receiving a broadcast signal from the broadcasting station 900 and a high-frequency signal transmitted through a coaxial line of CATV or the like, in addition to an Ethernet™ termination function.

Moreover, the electronic equipment system 130 is provided with, as a real time delivery reception section, a broadcast signal reception and reproduction processing section 932 and a streaming delivery reception section 934. The broadcast signal reception and reproduction processing section 932 converts a signal received by using a broadcast receiver or CATV receiver into a picture signal. The streaming delivery reception section 934 receives a signal delivered by streaming from the streaming sever 902.

The content output section 139, upon receipt of information from the broadcast signal reception and reproduction processing section 932, streaming delivery reception section 934, or content storage section 137, recognizes information to reproduce then by referring to the program information reference section 133, selects the information, and outputs the information by switching.

According to the present configuration example, as real time delivery means, signal processing functions are provided to process both of a high-frequency signal that is transmitted by way of broadcast radio waves or a coaxial line and a signal that is transmitted by way of a data transfer network. Accordingly, when the same program is delivered by both ways, an audience can continuously view the program by real time delivery even if a failure occurs in one of these ways.

The content storage section 137 of the electronic equipment system 130, which is, for example, a hard disk or the like, has a finite capacity. Accordingly, even if the capacity of the content storage section 137 is considerably large in comparison with the file size of a content, a new file will not be able to be downloaded sometime or other if past downloaded files are accumulated.

To prevent such a situation from occurring, a conceivable method is to limit the period of time for which a downloaded file is kept and to automatically delete the file at expiration of this limited period. For example, if a deletion policy of deleting a content downloaded two weeks ago is registered in advance, it is possible to avoid a situation in which the content storage section 137 is filled with unnecessary files. In this event, if the order of priority of deletion is predetermined based on the subject matter of a program content or on the size of a file, it is possible to delete files in the predetermined order of priority.

As another method, it is also possible to use a method in which delivered is a file to which the program delivery side sets a mechanism of automatically deleting the file itself or reducing its own file size at a certain time. For example, for the form of a content during delivery, a non-rewritable batch file is delivered that includes the file of a program content itself and a script file in which a content reproduction execution command and a file deletion execution command are described. At the program start time of the program content in question, the batch file of this program content is executed when a audience has selected the channel so that the program is reproduced. Based on the script described in the batch file, the reproduction of the file of the program content is carried out. When the reproduction of the program content is completed, the deletion of the file is carried out based on the script described in the batch file.

Moreover, if a reproduction-disable time (the time at which a file is disabled for reproduction) is described in the batch file, and if it is periodically checked whether or not the reproduction-disable time has come by periodically checking the current time by using the date and time reference section 136, then the time of deletion can be set not only for the time at which the reproduction of a program content is completed, but also for various times.

Furthermore, apart from the method of including the required information in a file itself, a method can also be used in which the date and time when a content is deleted is additionally provided as information to be registered with the program information registration and providing system 120, and the program information reference section 133 of the electronic equipment system 130, by referencing the information, determines whether or not to delete the file of the content.

Further, apart from the mechanism of automatically deleting a file's own self, a method can also be used in which the contents of a file are rewritten into "Null" or the like at the reproduction-disable time. In this case, if the electronic equipment system 130 is provided with a mechanism of periodically extracting and deleting a file with the "Null" contents, it is possible to prevent the content storage section 137 from being filled with files with the "Null" contents.

Regarding the form of the electronic equipment system 130, the electronic equipment system 130 may be in the form of a set top box (STB) or may be an integral unit with a display that is configured to enable a user to view a content by attaching content display means such as a display unit to the output terminal of the content output section 139. Moreover, each functional block does not need to be accommodated in a single casing. For example, the functional blocks other than the content storage section 137 are packaged in a single casing, and the content storage section 137 may be externally attached to the casing.

Moreover, according to the present configuration example, a description has been given of a case where the content output section 139 outputs only one content. However, the present invention is not limited to such a case. The content output section 139 may also simultaneously output a plurality of contents the programs of which are scheduled in programming at the same time.

According to the present configuration example, a configuration is used in which the content storage section 137 is incorporated in the electronic equipment system 130. However, the content storage section 137 may be provided outside the electronic equipment system 130 as long as the non-real time delivery reception section 135 is connected to the content storage section 137.

Regarding the program information, in addition to the information cited above, other program information may be added, such as a program title, program outline, program end time, content file size (in case of downloading delivery or streaming delivery), and reproduction rate. If delivery is performed by file downloading, it is also possible to include in the program information the date and time when uploading should be performed to be able to perform downloading at a certain date and time. As other program information, it is also possible to include, as related information, an advertisement by a sponsor of the program. It may be configured that for a program, not only the content of the program but also a sponsor's commercial video is downloaded before the program is started. A content deliverer registers the above-described pieces of information with the program information registration and providing system 120. Thereafter, the electronic equipment system 130 downloads and uses these pieces of information. The program information registration and providing system 120 includes a registration section for accepting a registration of program information and a delivery section for delivering the registered program information to an audience.

Determination as to whether a program content has been already downloaded or has not yet been downloaded can be performed by the following method. If a history of downloading is kept for a certain period of time (for example, until after the reproduction of a program is completed) in the electronic equipment system 130 (for example, in the control section 138a), it is possible to determine whether or not a program content has been already downloaded, by referencing the kept history information. As another method, if a one-to-one correspondence is made between a downloaded file name and the file of a program content, it is possible to determine whether or not a program content has been already downloaded, by referencing those file names that are present in the content storage section 137. For a method of making a one-to-one correspondence, for example, it is possible to make a one-to-one correspondence between a program and a corresponding content file if the file name is made identical to the content identifier of the program. As another method, an area for storing information, for each program, on whether or not the content has been already downloaded is set in the program information reference section 133 of the electronic equipment system 130 and is checked when required.

Moreover, as still another method, the present invention can be implemented even if the information on whether or not the content has been already downloaded is not kept. Specifically, when a program content is desired to be downloaded, it is checked whether or not a file having the same name as the file name of the program content desired to be downloaded already exists in the content storage section 137. If a file having the same name exists in the content storage section 137, it can be found that the file in question has been already downloaded. Therefore, downloading operation is stopped then. If a file having the same name does not exist, it is sufficient to start downloading.

If it is configured that the information on whether or not the content has been already downloaded is kept on the server side, all the information on those audiences who may view a program content needs to be kept on the server side, in which case it is difficult to manage the information on each audience when the number of audiences increases. For example, in a case where there are several hundreds of millions of prospective audiences, a long time is required to search the information on these viewers, and it is impossible to handle it. On the other hand, according to the present invention, such a problem does not arise because the electronic equipment system 130 on the receiving side keeps the information on whether or not a content has been already downloaded.

A method may be used in which a commercial video by a sponsor of a program is downloaded in advance. It is possible to adopt a method in which a commercial video is displayed by reproducing the downloaded video whereas the content of a program itself is reproduced by receiving real time delivery. When reproduction is performed using this method, it is sufficient to divide a time frame into time sub-frames and change signals to pass over to the content output section so that a downloaded file is reproduced during the predetermined time sub-frame for commercials and, when next comes the time sub-frame for a program content itself, real time delivery is performed.

Conversely, even in a case where a commercial is received by real time delivery and a program content itself is delivered in non-real time, it is possible to implement these deliveries by dividing a time frame into time sub-frames having respectively allotted time lengths and by changing signals to pass over to the content reproduction device.

The method of transferring an IP packet may be Point-to-Point transfer or may be another transfer method such as multicast transfer.

As another method, the present invention can be implemented without any problem even by using a method in which a file to be downloaded is time-divided and then downloaded. Specifically, this method is as follows. The file of a content to be delivered by downloading is divided, and only part of the divided file is downloaded in advance. The remaining part of the file is made to have as large a size as can be delivered in time for reproduction at the program start time even if the remaining part of the file is downloaded, combined with the previously downloaded part, and then reproduced when the situation has actually come to permit the reproduction of the program. Then, in actuality, when the situation has come to permit the reproduction of the program, the remaining part of the file is downloaded and combined with the previously downloaded part, and then the program is reproduced.

In a case where there are many receivable channels, a method may be used in which a group of channels is designated on which a program content can be immediately reproduced at a reproduction rate specific to the program content even when channels are changed at a certain time. This method is as follows, for example. In a system having 300 channels numbered 1 to 300, the channels 1 to 100 are configured, by applying the present invention, to allow all download program contents to be downloaded, and the channels 101 to 300 are configured to allow only those programs with a to-be-viewed making made thereon by a audience to be downloaded.

EXAMPLES

According to the present invention, a mechanism is additionally provided that prevents a audience from viewing a downloaded program content before the program start time. Such a new challenge is addressed because it is a general rule in television broadcasting that an audience cannot view a content before the program start time of the content.

In the first configuration example shown in FIG. 2, a time-of-day clock (the date and time reference section 136) to refer to is predetermined, and a user refers to the clock, thereby referencing the current time (see, for example, the description at Step 405 in FIG. 5 and others). When the current time coincides with the program start time of a program content, the reproduction of the program content is started. Assuming that no malicious user exists, a program content cannot be viewed unless its program start time has come as in the case of television broadcasting. However, a malicious user might try to view a downloaded file before the program start time in some way. For example, a conceivable situation is that a user accesses the content storage section 137 and copies a stored program content into a computer to view it on the computer before the program start time. An unauthorized-reproduction prevention method to prevent this from happening will be described in detail.

10. First Example

Figure 11:
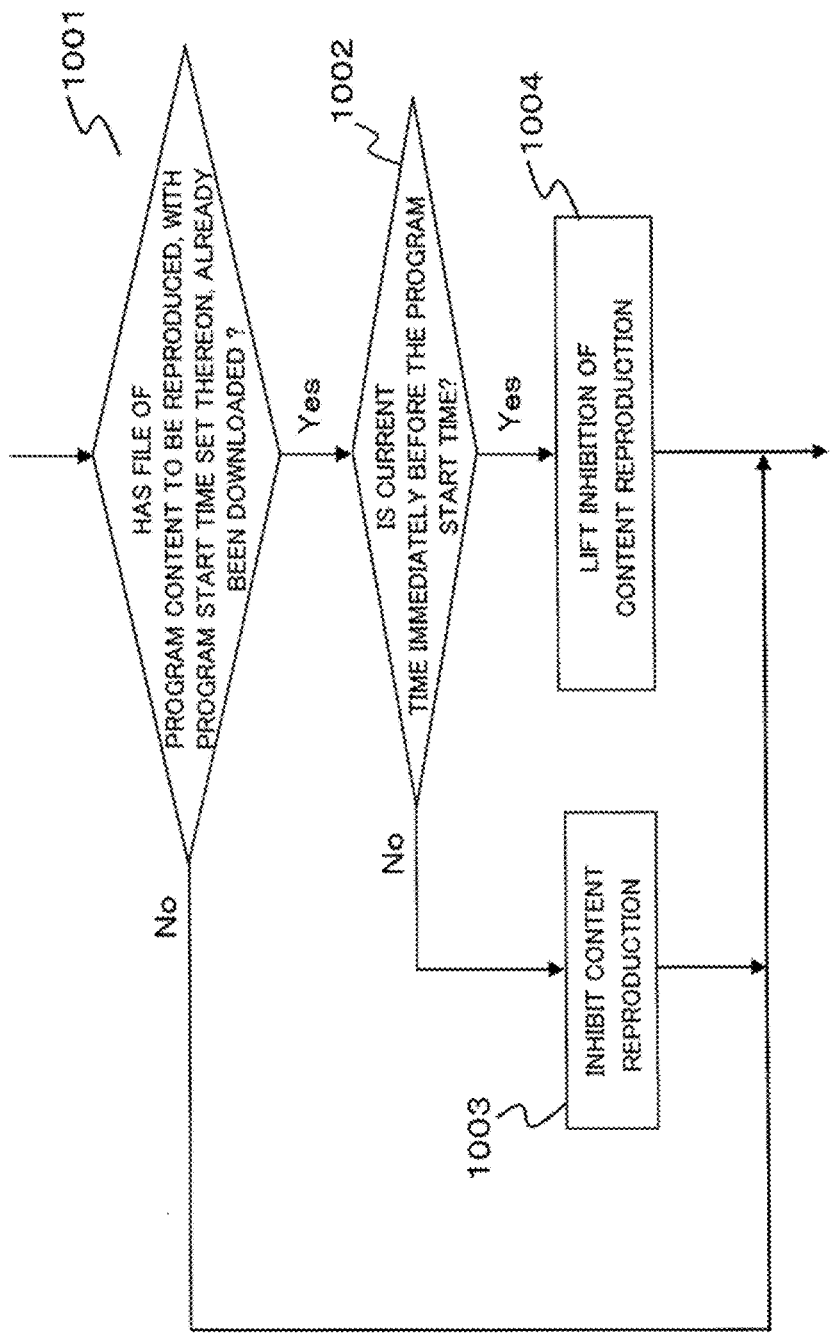
FIG. 11 is a flowchart showing an unauthorized-reproduction prevention method according to a first example of the present invention.

FIG. 11 is a flowchart showing an unauthorized-reproduction prevention method according to a first example of the present invention. First, a content supplier imposes access restriction on a file in advance before uploading the file to the non-real time delivery providing system 101. Here, a program start time (or a reproduction start time) is set on a file in advance, and the electronic equipment system 130 according to the above-described first or second configuration example downloads the file according a schedule made as described above and stores the file in the content storage section 137.

If the file of a program content to reproduce has been already stored in the content storage section 137 (Step 1001: Yes), the reproduction control section 138b references the current date and time by accessing the date and time reference section 136 when opening the file, and determines whether or not the current time is immediately before the reproduction start time set on the file (Step 1002). Here, a time immediately before a program start time is the time earlier than the program start time by a period of time required to prepare for the reproduction of a program content. For example, assuming that it takes one minute to prepare for the reproduction of the file of a program content, the access restriction is lifted one minute before the program start time of the program content. The period of time required to prepare for reproduction can also be designated in advance by a content creator with consideration given to the users' average environment for reproduction.

If the current time is not immediately before the reproduction start time (Step 1002: No), the reproduction of the program content in question is inhibited (Step 1003). If the current time is immediately before the reproduction start time (Step 1002: Yes), the reproduction control section 138b lifts the access restriction on the file so that the program content in question can be reproduced (Step 1004).

11. Second Example

Figure 12:
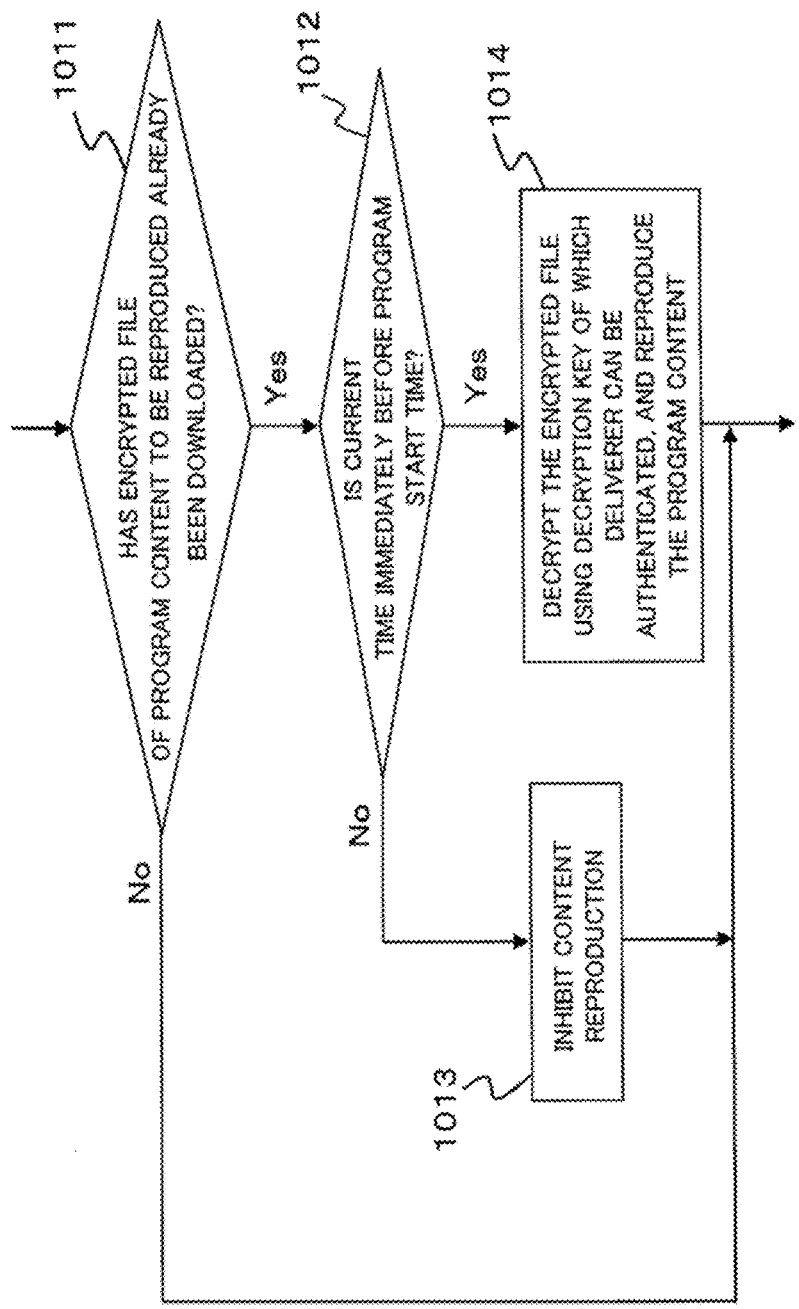
FIG. 12 is a flowchart showing an unauthorized-reproduction prevention method according to a second example of the present invention.

FIG. 12 is a flowchart showing an unauthorized-reproduction prevention method according to a second example of the present invention. First, a content supplier encrypts a file in advance by using a predetermined encryption key and uploads it to the non-real time delivery providing system 101. The electronic equipment system 130 according to the above-described first or second configuration example downloads this file according to a schedule made as described above and stores the file in the content storage section 137.

If the encrypted file of a program content to reproduce has been already stored in the content storage section 137 (Step 1011: Yes), the reproduction control section 138b references the current date and time by accessing the date and time reference section 136 when opening the file, and determines whether or not the current time is immediately before the program start time (Step 1012). The meaning of "immediately before" is as described in the foregoing first example.

If the current time is not immediately before the program start time (Step 1012: No), the reproduction of the program content in question (here, the decryption of the file of the program content) is inhibited (Step 1013). If the current time is immediately before the program start time (Step 1012: Yes), the reproduction control section 138b decrypts the file in question by using a decryption key and reproduces the decrypted program content (Step 1014). However, this decryption key corresponds to the encryption key used by the content supplier and has key information capable of authenticating the content supplier. For example, assuming that the encryption key used by the content supplier is a secret key and the decryption key used on the receiving side is a public key, it can be authenticated that the content is one from the legitimate content supplier if decryption can be accomplished with the receiving-side decryption key. Such a decryption key is a public key and may be stored in a general memory.

12. Third Example

Figure 13:
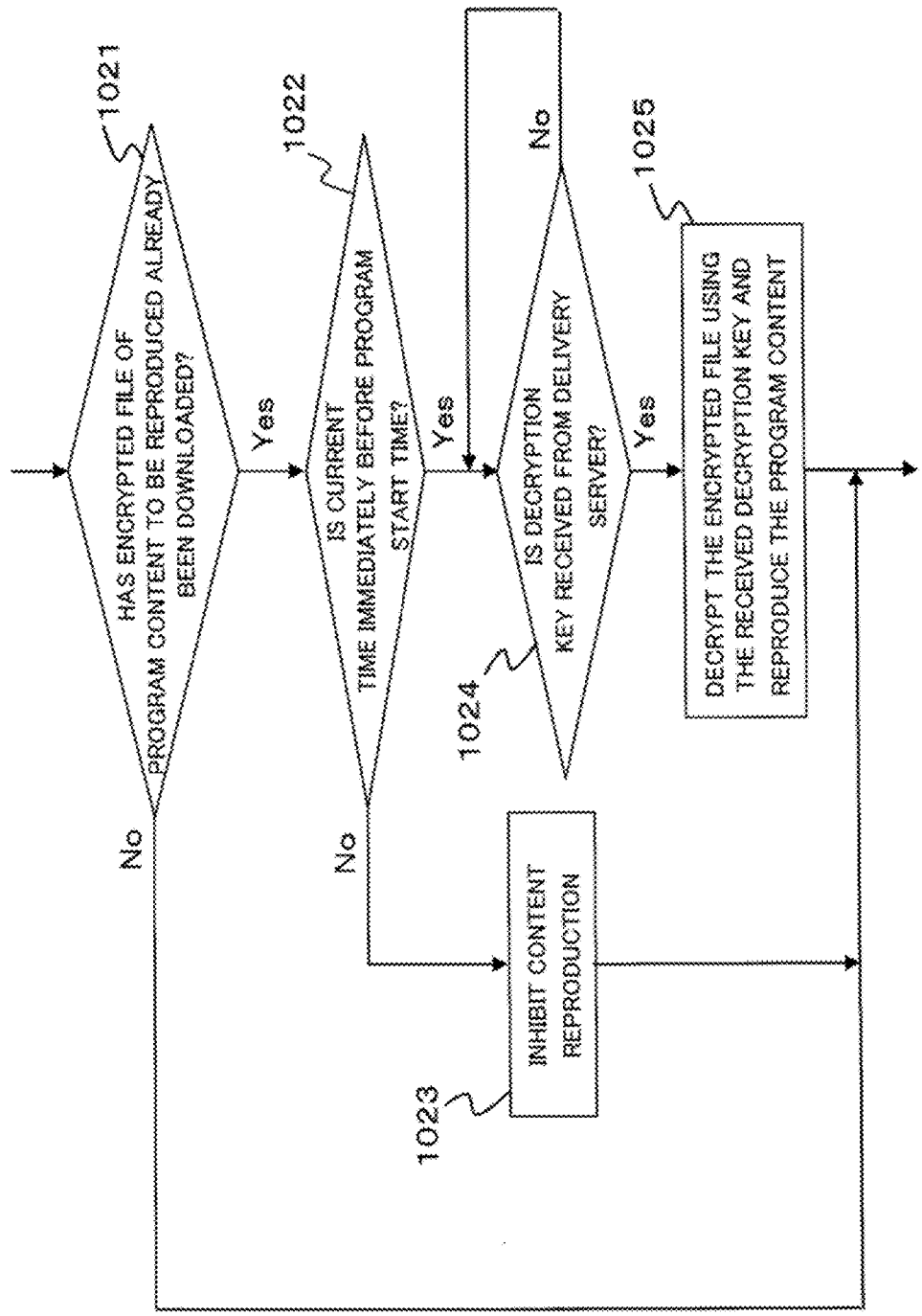
FIG. 13 is a flowchart showing an unauthorized-reproduction prevention method according to a third example of the present invention.

FIG. 13 is a flowchart showing an unauthorized-reproduction prevention method according to a third example of the present invention. First, a content supplier encrypts a file in advance and uploads it to the non-real time delivery providing system 101. The electronic equipment system 130 according to the above-described first or second configuration example downloads this file according to a schedule made as described above and stores the file in the content storage section 137.

If the encrypted file of a program content to reproduce has been already stored in the content storage section 137 (Step 1021: Yes), the reproduction control section 138b references the current date and time by accessing the date and time reference section 136 when opening the file, and determines whether or not the current time is immediately before the program start time (Step 1022). The meaning of "immediately before" is as described above.

If the current time is not immediately before the program start time (Step 1022: No), the reproduction of the program content in question is inhibited (Step 1023). If the current time is immediately before the program start time (Step 1022: Yes), the control section 138a determines whether or not a decryption key has been delivered from the contents providing system 100 (Step 1024). The contents providing system 100 delivers the decryption key for this file to the electronic equipment system 130, which is a client, in accordance with its own date and time. When the decryption key is received (Step 1024: Yes), the reproduction control section 138b decrypts the file by using the received decryption key and reproduces the decrypted program content (Step 1025).

Therefore, according to the third example, even if the time acquired from the date and time reference section 136 of the electronic equipment system 130 is intentionally changed, a user cannot decrypt a content until a decryption key is received because the contents providing system 100 delivers the decryption key in accordance with its own date and time. That is, it is possible to effectively prevent unauthorized reproduction.

Note that it is also possible to use a method in which by providing a decryption key with a function of checking the current time, a decryption key references the current time by using a date and time check section included in the system and, only when it is confirmed that the current time is past the program start time, is caused to function as the decryption key.

13. Fourth Example

Despite a method using a time and encryption in combination as described in the foregoing third example, a program content can be viewed before its program start time if a malicious user changes the time on a clock that is referenced by the date and time reference section 136. Hereinafter, as a fourth example of the present invention, another method for preventing an unauthorized act performed by changing the time on a clock will be described.

Figure 14:
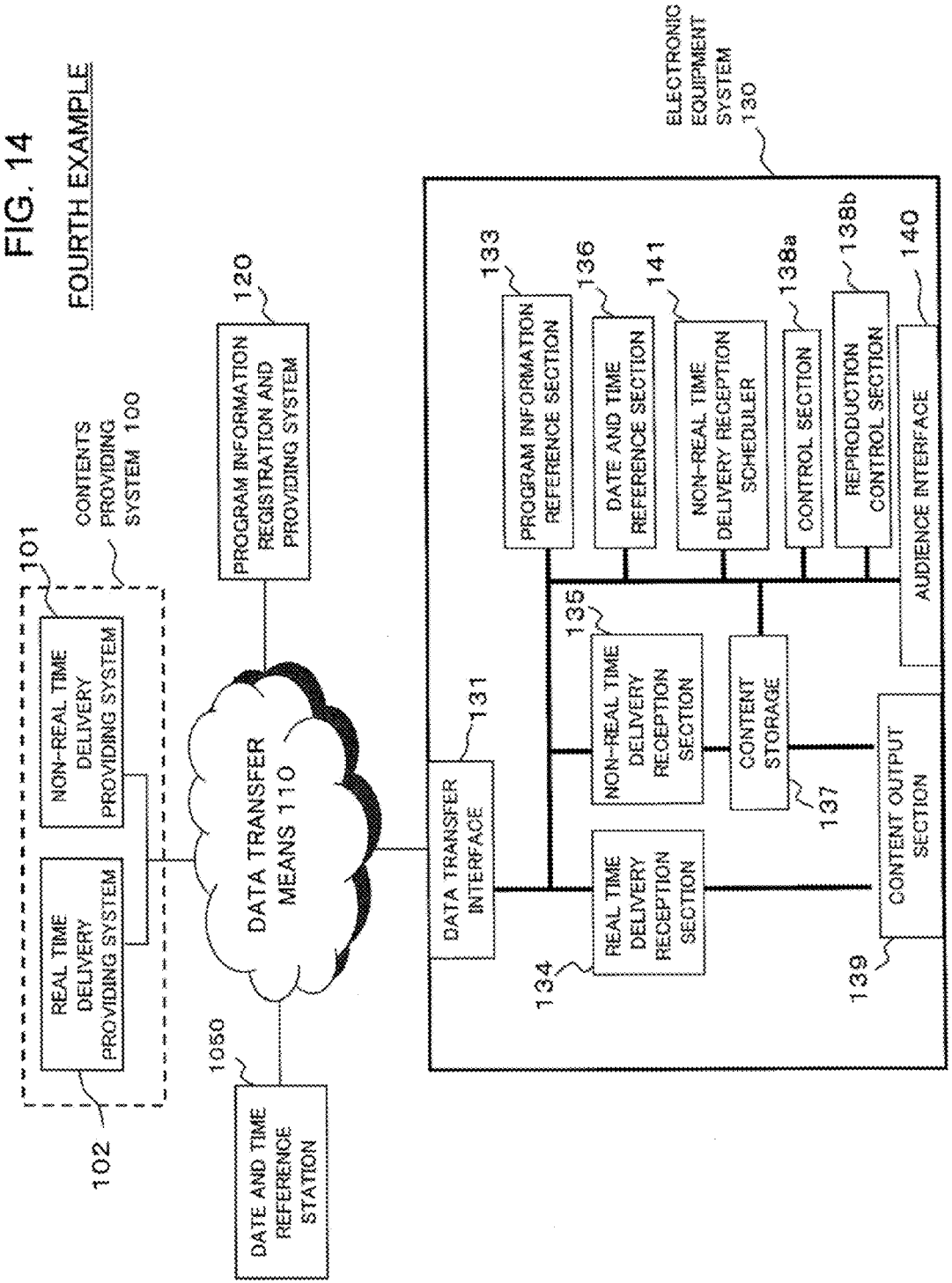
FIG. 14 is a block diagram showing a schematic configuration of an electronic equipment system in a content delivery system according to the fourth example of the present invention.

FIG. 14 is a block diagram showing a schematic configuration of an electronic equipment system in a content delivery system according to the fourth example of the present invention. However, blocks having functions similar to those shown in FIG. 2 are denoted by the same reference numerals in FIG. 2, and a description thereof will be omitted where appropriate.

In the present example, an unauthorized act performed by changing the time on a clock is prevented by using a date and time base station 1050. Specifically, the system is configured to include the date and time base station 1050 connected to the data transfer means 110. The date and time base station 1050 is connected to another date and time base station through a network and is synchronized with the other date and time base station to have an accurate date and time. The electronic equipment system 130 makes access to the date and time base station 1050 at a command of the control section 138a.

13.1) First Time Change Prevention Method

A first method for preventing an unauthorized act performed by changing the time on a clock is to check an accurate time by accessing the date and time base station 1050 immediately before a program start time. This method is as follows. Access to the date and time base station 1050 is made immediately before every program start time, and a packet with time authentication attached thereto is received from the date and time base station 1050. After it is confirmed that the date and time reference section 136, referred to by the electronic equipment system 130, shows an accurate time, a reproduction device is activated through the content output section 139.

The electronic equipment system 130 can confirm that the sender of the message containing the time information is the date and time base station 1050, by accessing a certificate authority that has issued an encryption key to the date and time base station 1050 and its corresponding decryption key. In addition, it can also be confirmed that the shown time is not tampered with. For example, the date and time base station 1050 encrypts data (data conversion) by using a secret key, and the electronic equipment system 130 decrypts the data by using a public key corresponding to the secret key, whereby the electronic equipment system 130 can authenticate the fact that the date and time information is received certainly from the date and time base station 1050.

Moreover, it can be confirmed by the following method that the time information and authentication information are not tampered with. Of these time information, authentication information, and the like, the date and time base station 1050 creates a digest of the information desired to be prevented from tampering, by using a hash function (irreversible conversion/encryption of data). Further, the date and time base station 1050 encrypts the digest (data conversion) by using a secret key that the date and time base station 1050 holds, and transmits the encrypted digest along with the time information and authentication information to the electronic equipment system 130. In the electronic equipment system 130, the received digest is decrypted by using a public key corresponding the secret key. Then, the outcome of the hash function of the received data (time information and authentication information) and the received digest are compared with each other, whereby it can be confirmed that the contents of the time information are not altered. That is, if the outcome of the hash function of the received data and the received digest agree with each other, then it can be concluded that no alteration is made.

Thereafter, the current time to be recognized is calculated by considering the period of time that elapses before the arrival of the packet from the date and time base station 1050 at the electronic equipment system 130. For example, in a case where it requires one minute for a packet from the date and time base station 1050 to arrive at the electronic equipment system 130, even if the authenticated time issued by the date and time base station 1050 is 10 a.m., the current time is corrected to 10:01 a.m. at the electronic equipment system 130. Thus, accurate time authentication can be accomplished.

13.2) Second Time Change Prevention Method

Next, a second method for preventing an unauthorized act performed by changing the time on a clock will be described. This method can be accomplished by inserting, immediately before Step 401 of "checking whether or not the state is that a program content should be newly reproduced" in FIG. 5, a step of checking whether or not the clock referred to by the date and time reference section 136 shows an accurate date and time. This is because, by doing so, the determination as to whether or not to newly reproduce a program content can be performed on the premise that the time is accurate. The following description is of the step of checking whether or not the clock referred to by the date and time reference section 136 shows an accurate date and time.

Figure 15:
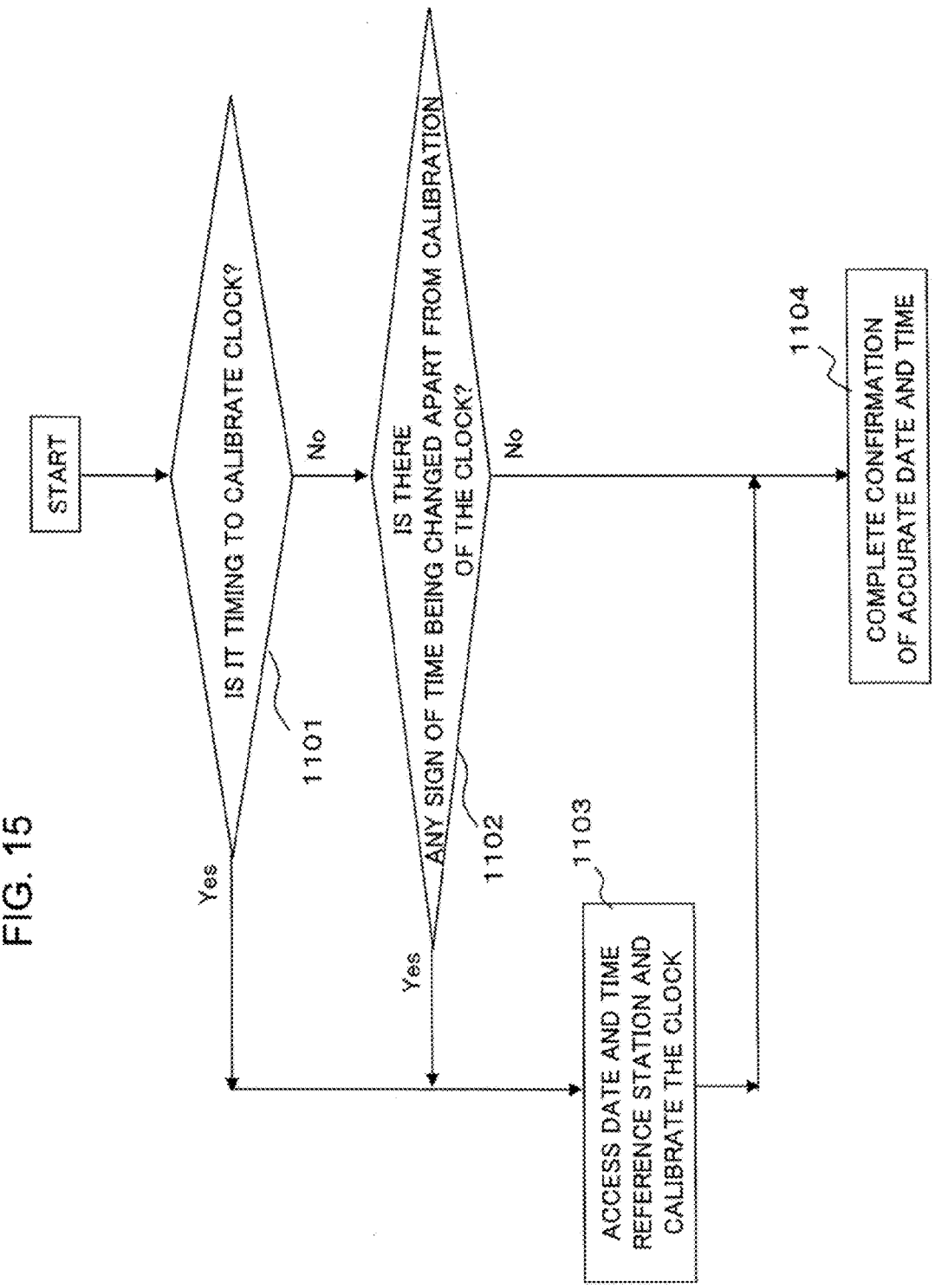
FIG. 15 is a flowchart showing a procedure of checking whether or not a referred-to clock shows an accurate date and time according to the fourth example.

FIG. 15 is a flowchart showing a procedure of checking whether or not the referred-to clock shows an accurate date and time according to the fourth example. Here, a system is considered in which in order to prevent the current time from being a false time, the system's clock is synchronized (calibrated) to the date and time base station 1050 through a network, or by utilizing the timing of a broadcast time signal. Calibration timing may be set periodically or may be when some event takes place.

First, it is determined whether or not it is a timing to calibrate the clock by checking the status (whether an event set to trigger calibration has occurred) and time (Step 1101). When it is a calibration timing (Step 1101: Yes), access is made to the date and time base station 1050, and the clock is calibrated (Step 1103). If it is not a timing to calibrate the clock (Step 1101: No), it is checked whether or not there is any sign of the clock being advanced or turned back (changed) apart from a change made by calibration (Step 1102). To implement this, for example, it is sufficient to provide, as a function of the operation system of the system managing the clock, a function of setting a flag on when the time on the clock is changed except when the clock is calibrated (that is, a memory area for such a fact is secured in the operation system, and a fact is recorded in the memory area.) An exception is made for the time of calibration because it is natural that the clock is changed at the time of calibration.

If there is no sign of the time being changed except a change made when the clock is calibrated (Step 1102: No), it can be supposed that the clock has an accurate date and time undamaged by an unauthorized act, and the confirmation of the accurate date and time is thus completed (Step 1104).

On the other hand, in Step 1102, if there is a sign of the time on the clock being changed except a change made when the clock is calibrated (Step 1102: Yes), access is made to the date and time base station 1050, and the time is calibrated (Step 1103). In addition, also when a periodic calibration of the clock is not performed, access is made to the date and time base station 1050, and the time on the clock is calibrated.

In the case of the above-described third example, time management is performed by the program supplier. Therefore, since a decryption key can be delivered at an appropriate timing under the responsibility of the program supplier, the electronic equipment system 130 on the audience side does not need to acquire time synchronization or time authentication.

Note that although a downloaded file cannot be viewed before the program start time in principle, there may be an exceptional program content that is set so as to be able to be viewed even before the program delivery time.

Moreover, it is also possible to adopt a method in which only those audiences who have the right of reproduction to a content are permitted to download the content. In this case, it is sufficient to provide, as a function of the electronic equipment system 130, a section that checks whether or not the right of reproduction to a content is granted and refuses to make a copy when the right is not granted. Furthermore, the present invention can be implemented without any problem even by using a method in which the right to browse a content or contents is set up, and only those audiences who have the right to browse can browse the content (s). In this case, it is sufficient to provide the electronic equipment system 130 with a section that checks whether or not the right to browse is granted.

In addition, the rule of permission for downloading can be set not only with respect to the right of reproduction but also with respect to another right. For example, the right of view is set, and means is provided for permitting only those users who have the right of view to a desired program to download that program.

14. Specific Examples

For a protocol to download a content, it is possible to use any one of HTTP, HTTPS, and FTP. In this case, it is sufficient to run the server program of HTTP, HTTPS, or FTP on the non-real time delivery providing system 101. In the electronic equipment system 130, it is sufficient to run the client program of HTTP, HTTPS, or FTP on the non-real time delivery reception section (file downloading processing section) 135. Implementation is also feasible even by using another file transfer protocol.

14.1)

The present invention can be implemented without any problem even by using downloading software having a function of temporarily stopping and resuming downloading. In this case, when a network is congested or a processing overflow has occurred in a server, the downloading of a content with a lower priority is temporarily stopped, whereby the downloading of a content with a higher priority can be completed without delay. Examples of such software include GNU Wget, for example. Wget is described in GNU Wget [online], [retrieved on 2008-1-8]. Retrieved from the Internet <URL: http://www.gnu.org/software/wget/>. The source codes of Wget are given in Index of/gnu/wget [online], [retrieved on 2008-1-8]. Retrieved from the Internet <URL: http://ftp.gnu.org/gnu/wget/>.

14.2)

In the step of measuring the usable bandwidth (the usable transfer rate) in a network described in Step 602 in FIG. 7 and others, the usable bandwidth in an IP network can be measured by using a tool such as Iperf. The source codes of Iperf are given in NLANR/DAST: Iperf—The TCP/UDP Bandwidth Measurement Tool [online], [retrieved on 2008-1-8]. Retrieved from the Internet <URL: http://dast.nlanr.net/Projects/Iperf/>.

14.3)

As a specific example of using the P2P technology, BitTorrent may be used, for example. The details of BitTorrent are described in BitTorrent.org [online], [retrieved on 2008-1-31]. Retrieved from the Internet <URL: http://www.bittorrent.org/>.

14.4)

As a control protocol for streaming, it is possible to use Real Time Streaming Protocol (RTSP). In this case, it is sufficient to run the server program of RTSP on the real time delivery providing system 102 in FIG. 2. In the electronic equipment system 130, it is sufficient to run the client program of RTSP on the real time delivery reception section 134. For other control protocols, protocols such as Session Initiation Protocol (SIP) can be used. For transfer of a content, Real Time Protocol (RTP) may also be used.

14.5)

When program information is delivered, in order to cause the electronic equipment system 130 to recognize that the information is updated, the program information registration and providing system 120 can notice the electronic equipment system 130 by delivering Rich Site Summary (RSS). The details of RSS are described in RSS 2.0 at Harvard Law [online], [retrieved on 2008-2-12]. Retrieved from the Internet <URL: http://cyber.law.harvard.edu/rss/rss.html>.

The program information registration and providing system 120 can deliver program information to the electronic equipment system 130 by using a file transfer protocol such as HTTP. The electronic equipment system 130 can periodically access the program information registration and providing system 120 and check whether or not the information is updated.

The present invention can be applied to various uses, such as IP television (IPTV) systems delivering program contents, television broadcasting systems broadcasting program contents over radio waves or by using a high-frequency electric signal, systems delivering program contents by streaming, and combinations of these systems.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for reproducing a content having at least one reproduction start time predetermined, comprising:

a non-real time receiver for receiving a content in non-real time;

a scheduler for scheduling reception of a content whose delivery method is non-real time delivery by the non-real time receiver based on a current time and a reproduction start time of the content;

a content storage section for storing at least one content received by the non-real time receiver; and a reproduction controller for inhibiting reproduction of a content stored in the content storage section before the reproduction start time of the content, wherein the reproduction controller calibrates a clock to be referenced according to information received from an external time-and-day reference station, wherein the information received from the external time-and-day reference station is previously encrypted according to an encryption key, wherein the reproduction controller uses a decryption key corresponding to the encryption key to decrypt the information.

2. The device according to claim 1, wherein the reproduction controller references the reproduction start time preset in the content to determine whether or not the content is permitted to be reproduced.

3. The device according to claim 1, wherein the content is previously encrypted using a content encryption key, wherein the reproduction controller uses a content decryption key corresponding to the content encryption key to decrypt the content and reproduce decrypted content immediately before the reproduction start time of the content.

4. The device according to claim 3, wherein the content encryption key is authenticated when the content can be decrypted using the content decryption key.

5. The device according to claim 3, wherein the reproduction controller receives the content decryption key from a content provider immediately before the reproduction start time of the content, wherein the content decryption key is designed to make its decryption function active only after the reproduction start time of the content.

6. The device according to claim 4, wherein the reproduction controller receives the content decryption key from a content provider immediately before the reproduction start time of the content, wherein the content decryption key is designed to make its decryption function active only after the reproduction start time of the content.

7. The device according to claim 1, wherein the encryption key is authenticated when the information can be decrypted using the decryption key.

8. The device according to claim 1, wherein the scheduler schedules the reception of the content before the reproduction start time so that the non-real time delivery of the content will have been completed before the reproduction start time.

9. The device according to claim 1, further comprising:
a time estimator for estimating a time required for non-real time delivery of the content,
wherein the scheduler schedules the reception of the content based on an estimated time, the reproduction start time and the current time.

10. An electronic equipment system comprising the device according to claim 1, further comprising:
an information input/output section which allows a user operation of selecting a desired content from the program information;
a data transfer interface for connecting the device to a network; and
an output section for outputting the content to reproduce it on a reproduction device.

11. A method for preventing unauthorized reproduction of a content having at least one reproduction start time predetermined, comprising:
scheduling reception of a content whose delivery method is non-real time delivery by the non-real time receiver based on a current time and a reproduction start time of the content;
storing at least one content received by the non-real time receiver in a content storage section; and
inhibiting reproduction of a content stored in the content storage section before the reproduction start time of the content,
wherein a clock to be referenced is calibrated according to information received from an external time-and-day reference station,
wherein the information received from the external time-and-day reference station is previously encrypted according to an encryption key, wherein a decryption key corresponding to the encryption key is used to decrypt the information.

12. The method according to claim 11, wherein the reproduction start time preset in the content is referenced to determine whether or not the content is permitted to be reproduced.

13. The method according to claim 11, wherein the content is previously encrypted using a content encryption key, wherein a content decryption key corresponding to the content encryption key is used to decrypt the content and reproduce decrypted content immediately before the reproduction start time of the content.

14. The method according to claim 13, wherein the content encryption key is authenticated when the content can be decrypted using the content decryption key.

15. The method according to claim 13, wherein the content decryption key is received from a content provider immediately before the reproduction start time of the content, wherein the content decryption key is designed to make its decryption function active only after the reproduction start time of the content.

16. The method according to claim 14, wherein the content decryption key is received from a content provider immediately before the reproduction start time of the content, wherein the content decryption key is designed to make its decryption function active only after the reproduction start time of the content.

17. The method according to claim 11, wherein the encryption key is authenticated when the information can be decrypted using the decryption key.

18. A non-transitory recording medium recording a computer program which instructs a computer to function as a device for reproducing a content having at least one reproduction start time predetermined, comprising:
scheduling reception of a content whose delivery method is non-real time delivery by the non-real time receiver based on a current time and a reproduction start time of the content;
storing at least one content received by the non-real time receiver in a content storage section; and
inhibiting reproduction of a content stored in the content storage section before the reproduction start time of the content,
wherein a clock to be referenced is calibrated according to information received from an external time-and-day reference station,
wherein the information received from the external time-and-day reference station is previously encrypted according to an encryption key, wherein a decryption key corresponding the encryption key is used to decrypt the information.

* * * * *